US010035666B2

(12) United States Patent
Redman

(10) Patent No.: US 10,035,666 B2
(45) Date of Patent: Jul. 31, 2018

(54) PALLET-EXCHANGE MACHINE INCLUDING BLADE ASSEMBLY TO ASSIST SUPPORT OF LOAD

(71) Applicant: Paul Redman, London (CA)

(72) Inventor: Paul Redman, London (CA)

( * ) Notice: Subject to any disclaimer, the term of this patent is extended or adjusted under 35 U.S.C. 154(b) by 0 days.

(21) Appl. No.: 14/761,795

(22) PCT Filed: Jan. 17, 2014

(86) PCT No.: PCT/IB2014/058357
§ 371 (c)(1),
(2) Date: Jul. 17, 2015

(87) PCT Pub. No.: WO2014/111890
PCT Pub. Date: Jul. 24, 2014

(65) Prior Publication Data
US 2015/0360884 A1    Dec. 17, 2015

Related U.S. Application Data

(60) Provisional application No. 61/754,596, filed on Jan. 20, 2013.

(51) Int. Cl.
*B65G 65/00* (2006.01)
*B65G 59/00* (2006.01)
(Continued)

(52) U.S. Cl.
CPC ............... *B65G 65/00* (2013.01); *B65G 1/00* (2013.01); *B65G 59/00* (2013.01); *B65G 60/00* (2013.01); *B65G 2201/0267* (2013.01)

(58) Field of Classification Search
CPC . B65G 2201/0267; B65G 60/00; B66F 9/183; Y10S 414/106; B65H 2301/42242; B65H 31/3045
(Continued)

(56) References Cited

U.S. PATENT DOCUMENTS 3,866,780 A * 2/1975 Miller ..................... B66F 9/183
294/87.1
3,929,366 A * 12/1975 Keverline ................ B66F 9/18
294/106
(Continued)

FOREIGN PATENT DOCUMENTS

EP        1369361 B1    1/2005
GB         957236 A     5/1964
(Continued)

OTHER PUBLICATIONS

International Search Report and Written Opinion; International application No. PCT/IB2014/058357; dated Apr. 30, 2014.

*Primary Examiner* — Mark C Hageman
(74) *Attorney, Agent, or Firm* — Tarolli, Sundheim, Covell & Tummino LLP

(57) ABSTRACT

Methods and apparatus are provided for exchanging pallets. The apparatus includes a pallet-exchange machine having a frame assembly being configured to receive a pallet supporting a load once the pallet is positioned to do just so; a clamp assembly being supported by the frame assembly, and the clamp assembly being configured to clamp and hold the load once the pallet is positioned in the clamp assembly to do just so; and a blade assembly being configured to be movable relative to the frame assembly between a load-support position and an no-load position, and the blade assembly being configured to assist in supporting the load once the clamp assembly is actuated to clamp and to hold the load and once the blade assembly is moved from no-load position to the load-support position to do just so.

11 Claims, 23 Drawing Sheets

(51) Int. Cl.
*B65G 60/00* (2006.01)
*B65G 1/00* (2006.01)

(58) Field of Classification Search
USPC .. 414/621, 622, 795.2, 799, 790.2, 925–929
See application file for complete search history.

(56) References Cited

U.S. PATENT DOCUMENTS

| | | | |
|---|---|---|---|
| 5,102,282 | A | 4/1992 | Maddox |
| 5,567,102 | A * | 10/1996 | Tanaka .................... B65G 1/00 414/274 |
| 5,951,238 | A * | 9/1999 | Duecker .............. B65G 57/302 414/794.9 |
| 6,045,324 | A | 4/2000 | Redman |
| 6,247,887 | B1 | 6/2001 | Springston et al. |
| 2005/0053450 | A1 | 3/2005 | Kantola et al. |
| 2010/0124476 | A1* | 5/2010 | Berlinger ................. B62B 3/04 414/457 |

FOREIGN PATENT DOCUMENTS

| | | | | |
|---|---|---|---|---|
| JP | 2005001750 | A | 1/2005 | |
| TW | M440301 | U | 11/2012 | |
| WO | 0026127 | A1 | 5/2000 | |
| WO | 2010057898 | A1 | 5/2010 | |
| WO | WO-2010057898 | A1 * | 5/2010 | ............... B65G 1/00 |

\* cited by examiner

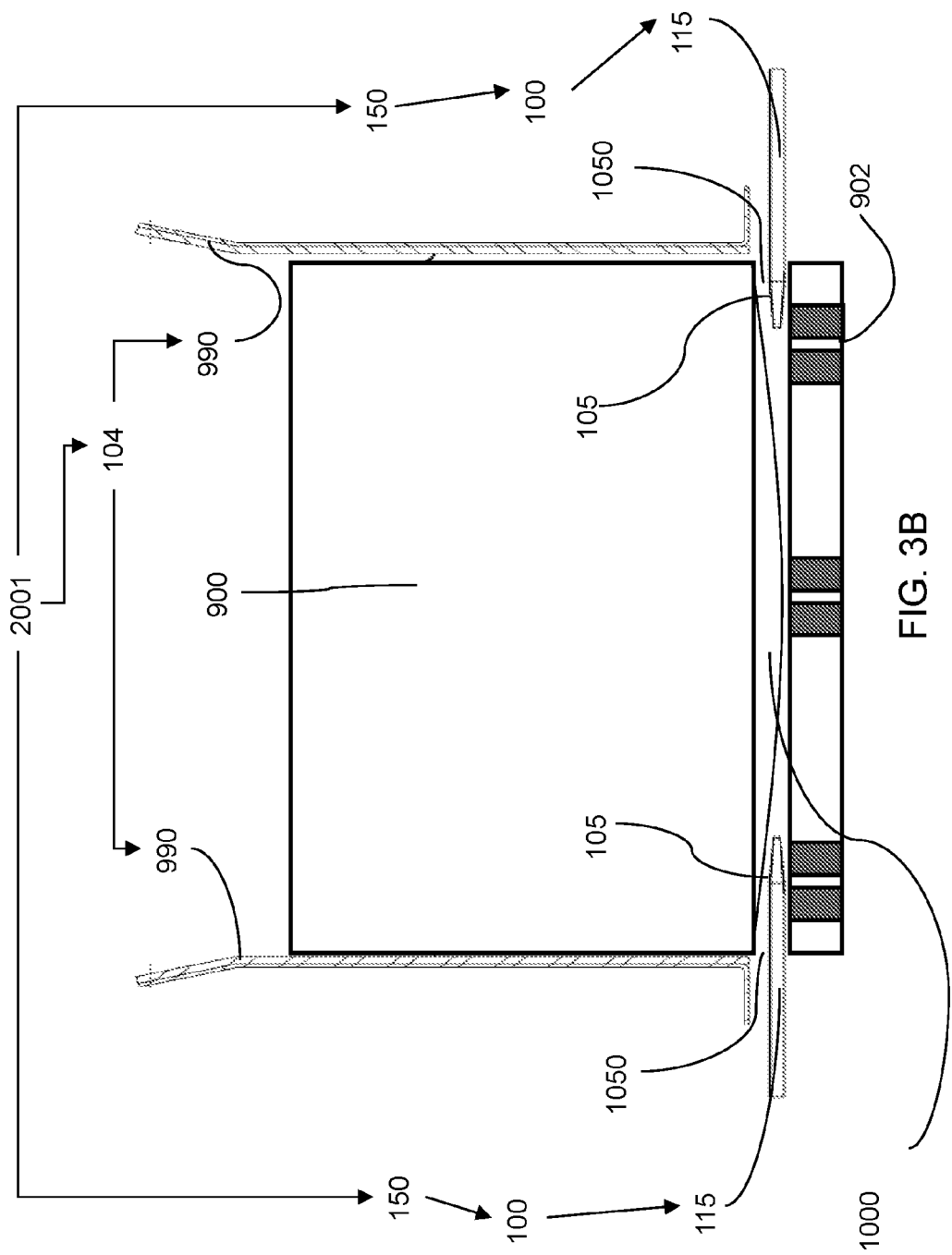

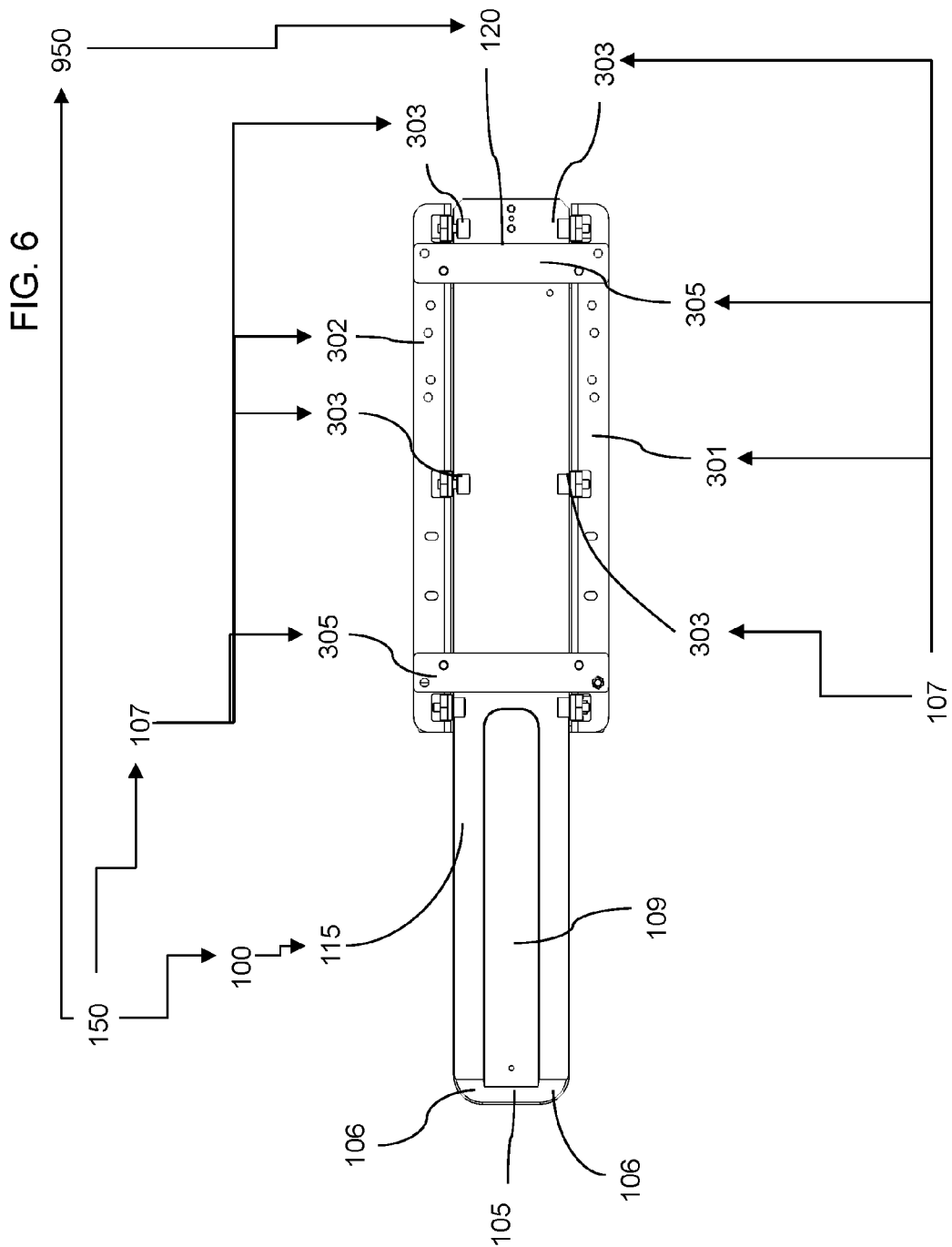

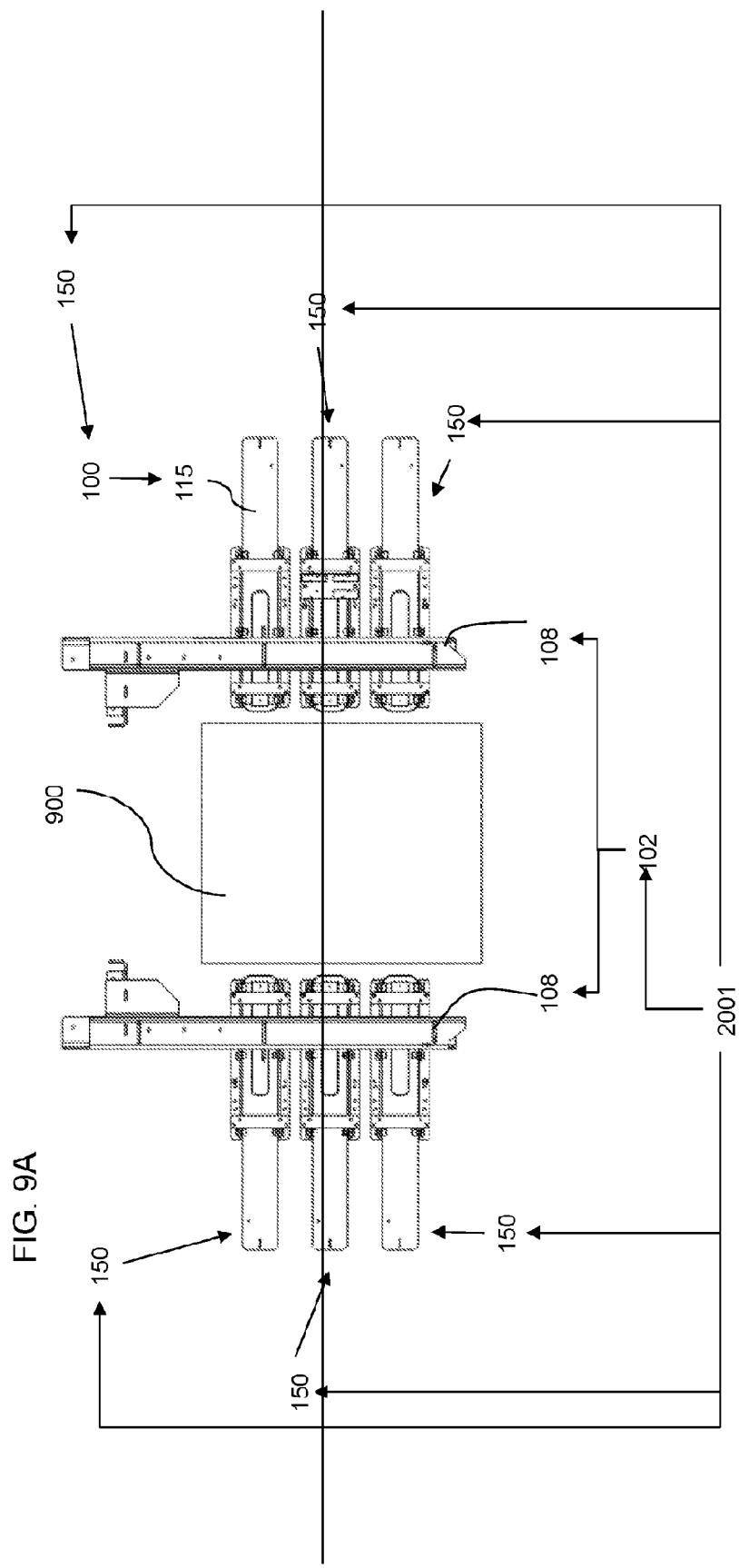

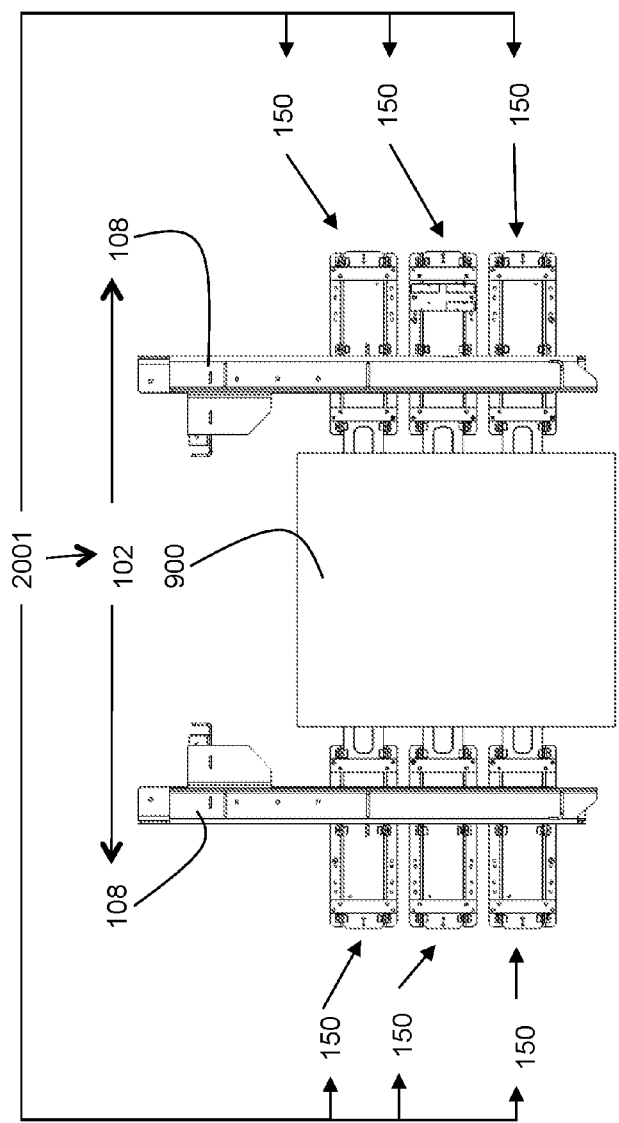
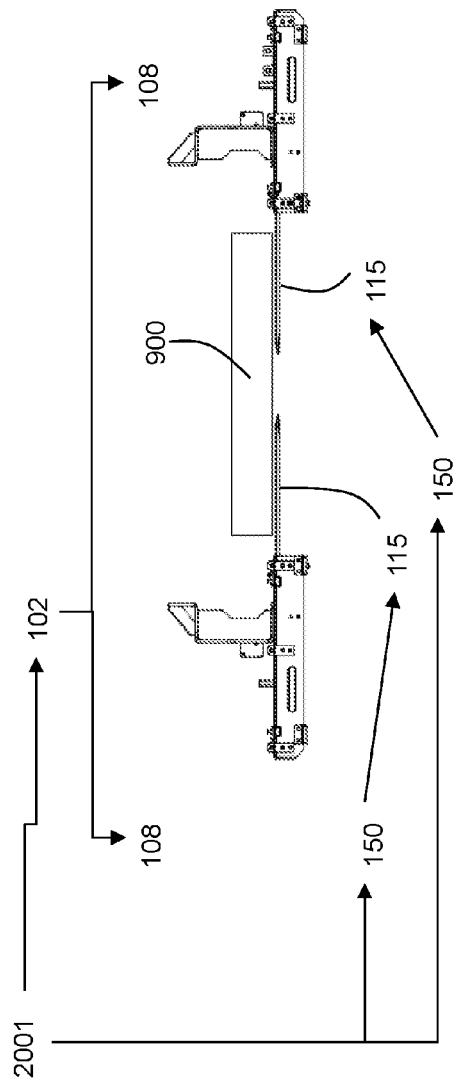
FIG. 10A
FIG. 10B

US 10,035,666 B2

PALLET-EXCHANGE MACHINE INCLUDING BLADE ASSEMBLY TO ASSIST SUPPORT OF LOAD

CROSS REFERENCE

This application is the U.S. national phase of PCT application No. PCT/IB2014/058357, filed Jan. 17, 2014, which claims the benefit of U.S. Provisional Patent Application Ser. No. 61/754,596, filed Jan. 20, 2013, entitled LOAD SUPPORT APPARATUS AND MATERIAL HANDLING SYSTEM, the entire contents of which are hereby incorporated by reference.

TECHNICAL FIELD

Aspects generally relate to pallet-exchange machines; more specifically, some aspects relate to a pallet-exchange machine including a blade assembly to assist support of a load.

BACKGROUND

Pallets are used to facilitate the movement and transport of loads supported on the pallets. Pallet-handling equipment (such as a pallet-exchange machine) is used to handle pallets, whether loaded or unloaded. Pallet-exchange machines (such as stacking clamps) are used to manipulate loads placed on the pallets. Other pallet-exchange machines (such as pallet exchangers) are configured to exchange loaded pallets.

Exchanging pallets with a load (also called a pallet load) is useful in situations where the pallet is unsuitable for a particular environment. For example, in some instances, a pallet used for transporting a load cannot be used to support the load in a food production facility. In another example, a production facility may exchange (replace) production pallets with transportation pallets before the load (also called a product) is shipped from the production facility.

SUMMARY

Problems associated with known pallet exchange machines were researched. An understanding of the problem and its solution has been identified, which is stated below.

Not all loads are sufficiently solid enough to allow them to be clamped (in a stationary position) in a pallet-exchange machine, and to remain self-supporting while being clamped. For example, flexible non-rigid packages (such as PET bottles, cans in trays, bags, or irregularly oriented case patterns that have large voids of no cases) can be problematic when used in pallet-exchange machines. Another type of load that is difficult to use with pallet-exchange machines is of the type stored in a combo (also called a combo package). The combo is a large cardboard open top box having a foot print of approximately (for example) 40 inches by 48 inches. The combo may be used, for example, in the food industry to transport raw material ingredients from food suppliers to food manufacturing companies.

When insufficiently solid loads are held in a pallet-exchange machine, the loads tend to belly or sag (usually in the middle bottom zone of the load) when the pallet is lowered away from the load as the load remains clamped in a stationary position. That is, parts of the load (whether cases, part of the load, or combo packages), tend to sag and rest, at least in part, on the pallet as the pallet is moved away from the load being clamped. Other kinds of loads, such as irregularly shaped or stacked loads, may shift when the pallet is lowered away from the load, leading to similar problems (such as, sagging of the load while the pallet is being exchanged for another pallet).

In order to mitigate, at least in part, the problems identified above, in accordance with an aspect, there is provided a pallet-exchange machine. The pallet-exchange machine includes a frame assembly. The frame assembly is configured to receive a pallet supporting a load once the pallet is positioned, in the frame assembly (to do just so). The pallet-exchange machine includes a clamp assembly. The clamp assembly is supported by the frame assembly. The clamp assembly is configured to clamp and hold the load once the pallet is positioned in the clamp assembly (to do just so). The pallet-exchange machine includes a blade assembly. The blade assembly is configured to be movable relative to the frame assembly between a load-support position and a no-load position. The blade assembly is configured to assist in supporting the load once the clamp assembly is actuated to clamp and to hold the load and once the blade assembly is moved from the no-load position to the load-support position (to do just so).

As the load is clamped and is held by the clamp assembly, the pallet may be moved away from the load; then, in response, the load sags and contacts, at least in part, the pallet, and the load also forms a gap. The gap is located between the pallet and the load where the load sags but does not contact the pallet at the load circumference. The blade assembly is configured to be actuated to move (configured to be moved) into the gap as the pallet is further lowered away from the load; this is done in such a way that the load sags and contacts, at least in part, the blade assembly. The blade assembly supports, at least in part (and preferably entirely), the load, while the pallet is free to be moved away from the load entirely (and then to be exchanged with another pallet).

As the pallet continues to be moved away from the load, the load does not make further contact with the pallet. The pallet is replaced with a replacement pallet; then, the replacement pallet is moved toward the load and is positioned under the load. The replacement pallet contacts, at least in part, the load. The load sags and forms a space between the load and the replacement pallet, and the space (or gap), located between the load and the replacement pallet, receives the blade assembly. Then, the blade assembly is moved out of the space, in such a way that the blade assembly no longer supports the load clamped by the clamp assembly; then the replacement pallet is moved further toward the load in such a way as to further support the load. The clamp assembly is configured to unclamp and then no longer holds the load, so that the load then becomes fully supported by the replacement pallet.

In order to mitigate, at least in part, the problems identified above, in accordance with an aspect, there is provided a blade assembly. The blade assembly includes a blade support frame. The blade assembly also includes a blade support. The blade support is movingly supported by the blade support frame. The blade assembly includes an actuator assembly. The actuator assembly is configured on (is positioned on) the blade support frame. The actuator assembly is configured for moving the blade assembly between a no-load position and a load-support position.

In order to mitigate, at least in part, the problems identified above, in accordance with an aspect, there is provided a method for exchanging pallets. The method includes: an operation including receiving a pallet supporting a load in a pallet exchanger. The method also includes an operation including clamping the load in a clamp assembly once the load is received in the pallet exchanger. The method also includes an operation including moving the pallet away from the load, so that a gap is formed between the pallet and the load where the load sags, and does not have to fully contact the pallet. The method also includes an operation including actuating movement of a blade assembly to a load-support position once the pallet is moved away from the load, so that the blade assembly assists in supporting the load, so that the pallet is free to be fully moved away from further contact with the load. The method also includes an operation, including replacing the pallet with a replacement pallet. The method also includes an operation, including moving the replacement pallet towards the load, and positioning the replacement pallet under the load, so that the replacement pallet contacts, at least in part, the load. The method also includes an operation, including actuating movement of the blade assembly to a no-load position so that the blade assembly no longer supports the load clamped by the clamp assembly once the replacement pallet contacts, at least in part, the load. The method also includes an operation including, unclamping the load so that the clamp assembly no longer supports the load, so that the load is then fully supported by the replacement pallet.

In order to mitigate, at least in part, the problems identified above, in accordance with an aspect, there is provided a method. The method includes receiving a pallet supporting a load once the pallet is positioned to do just so in a frame assembly. The method also includes clamping and holding the load once the pallet is positioned in the clamp assembly (to do just so) by a clamp assembly that is supported by the frame assembly. The method also includes moving a blade assembly relative to the frame assembly between a load-support position and a no-load position. The method also includes using the blade assembly to assist in supporting the load once the clamp assembly is actuated to clamp and to hold the load, and once the blade assembly is moved from the no-load position to the load-support position (to do just so).

In order to mitigate, at least in part, the problems identified above, in accordance with an aspect, there is provided other aspects as identified in the claims.

DETAILED DESCRIPTION OF THE DRAWINGS

The non-limiting embodiments may be more fully appreciated by reference to the following detailed description of the non-limiting embodiments when taken in conjunction with the accompanying drawings, in which.

Figure 1:
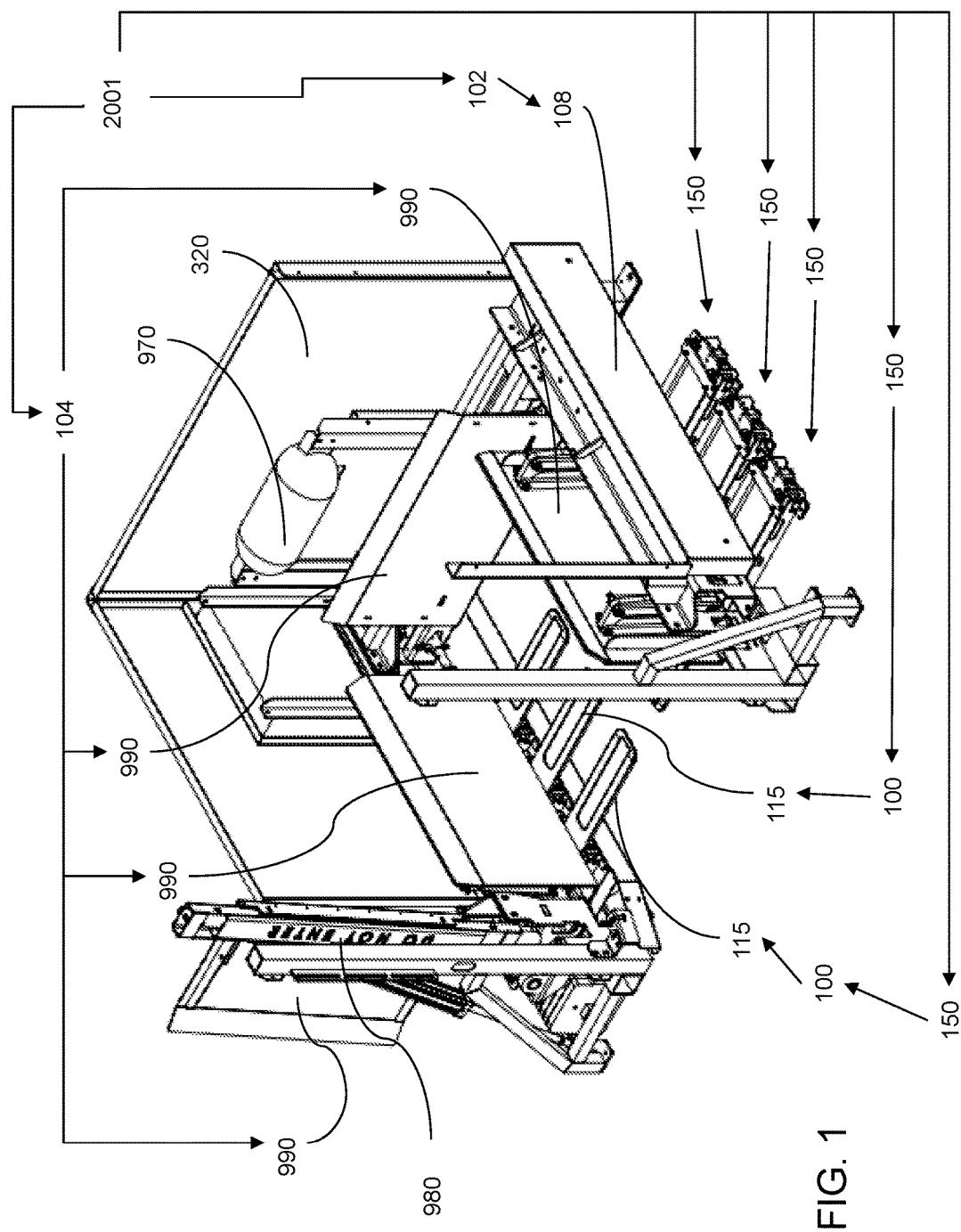
FIG. 1 (SHEET 1/23) depicts a perspective view of an example of a pallet-exchange machine (2001)
Figure 2:
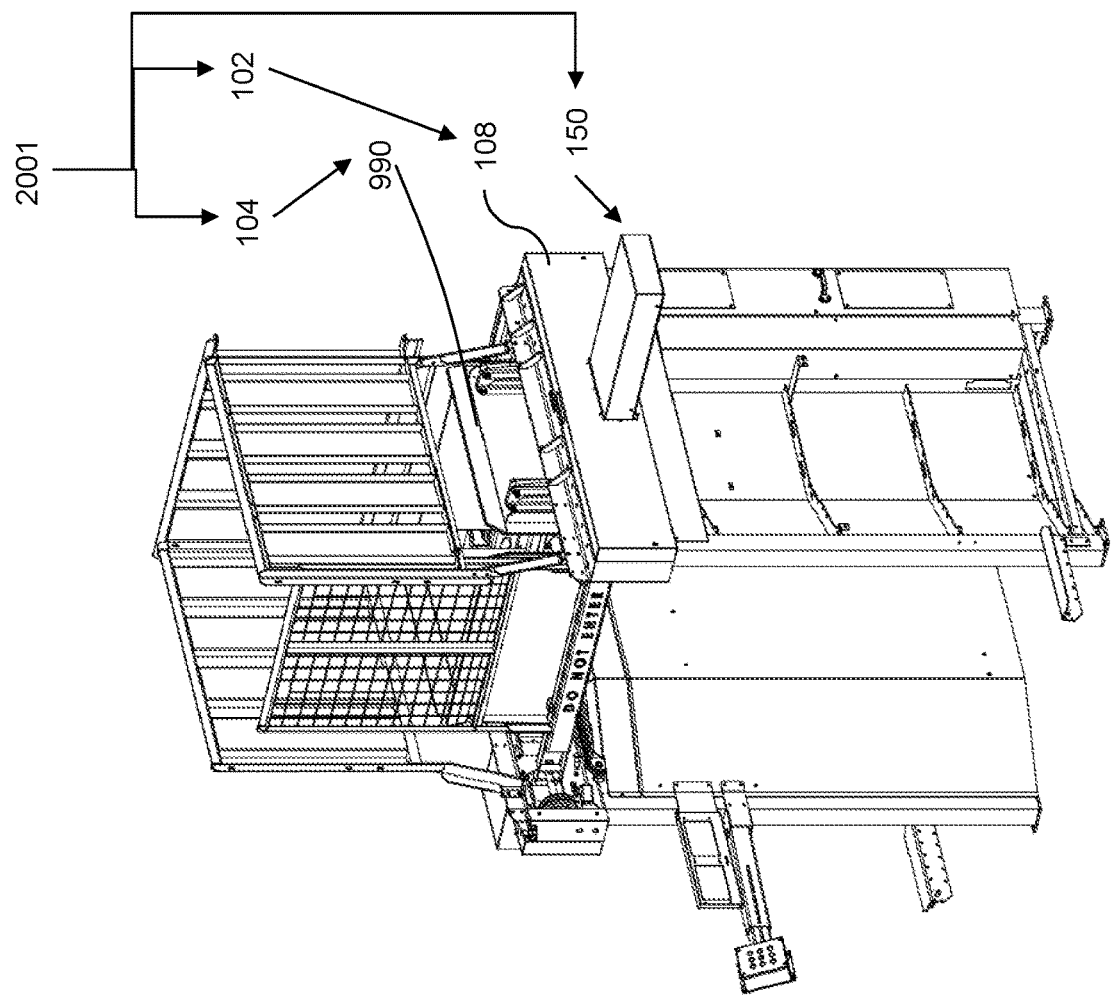
FIG. 2 (SHEET 2/23) depicts a perspective view of another example of the pallet-exchange machine (2001) of FIG. 1.
Figure 3A:
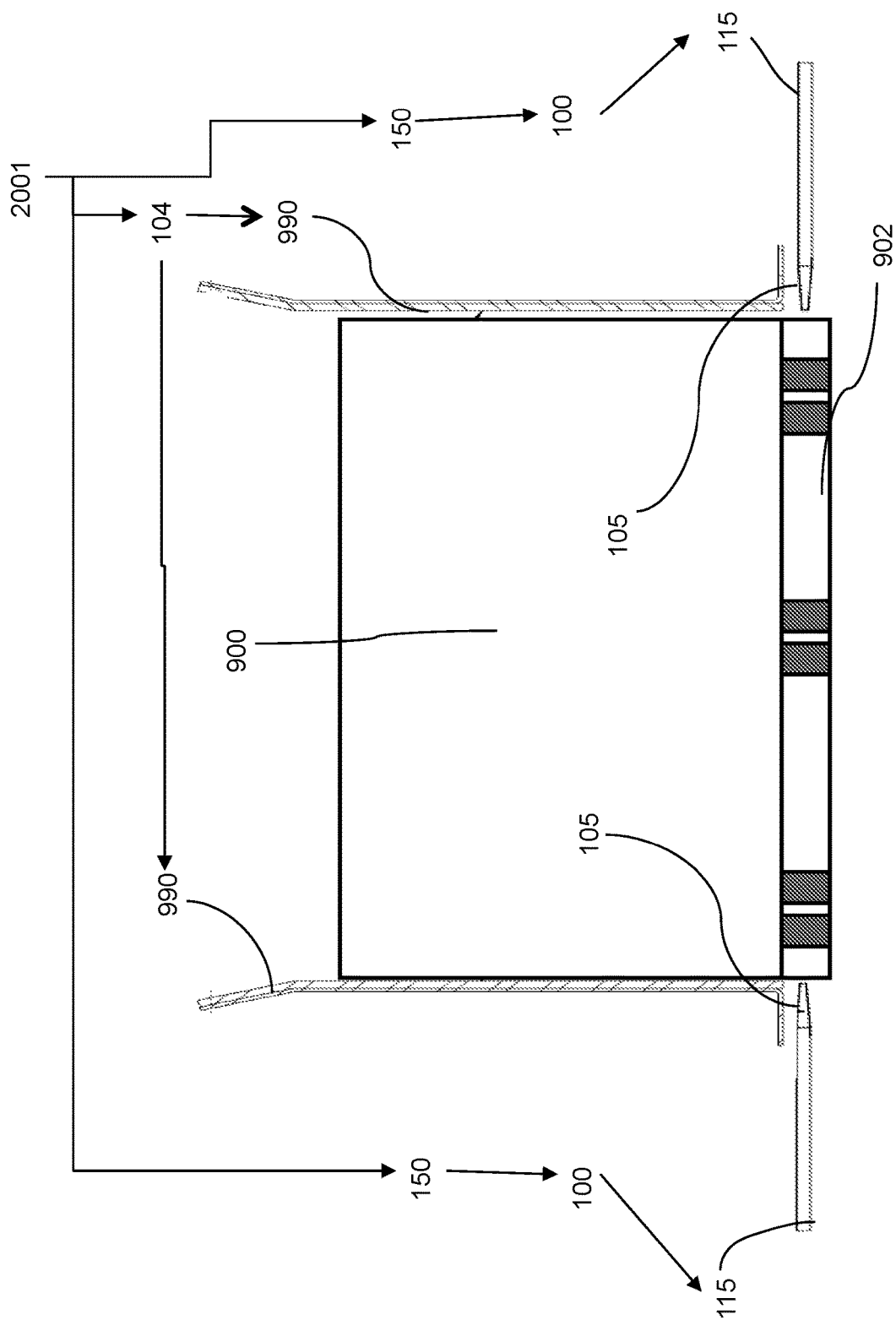
Figure 4:
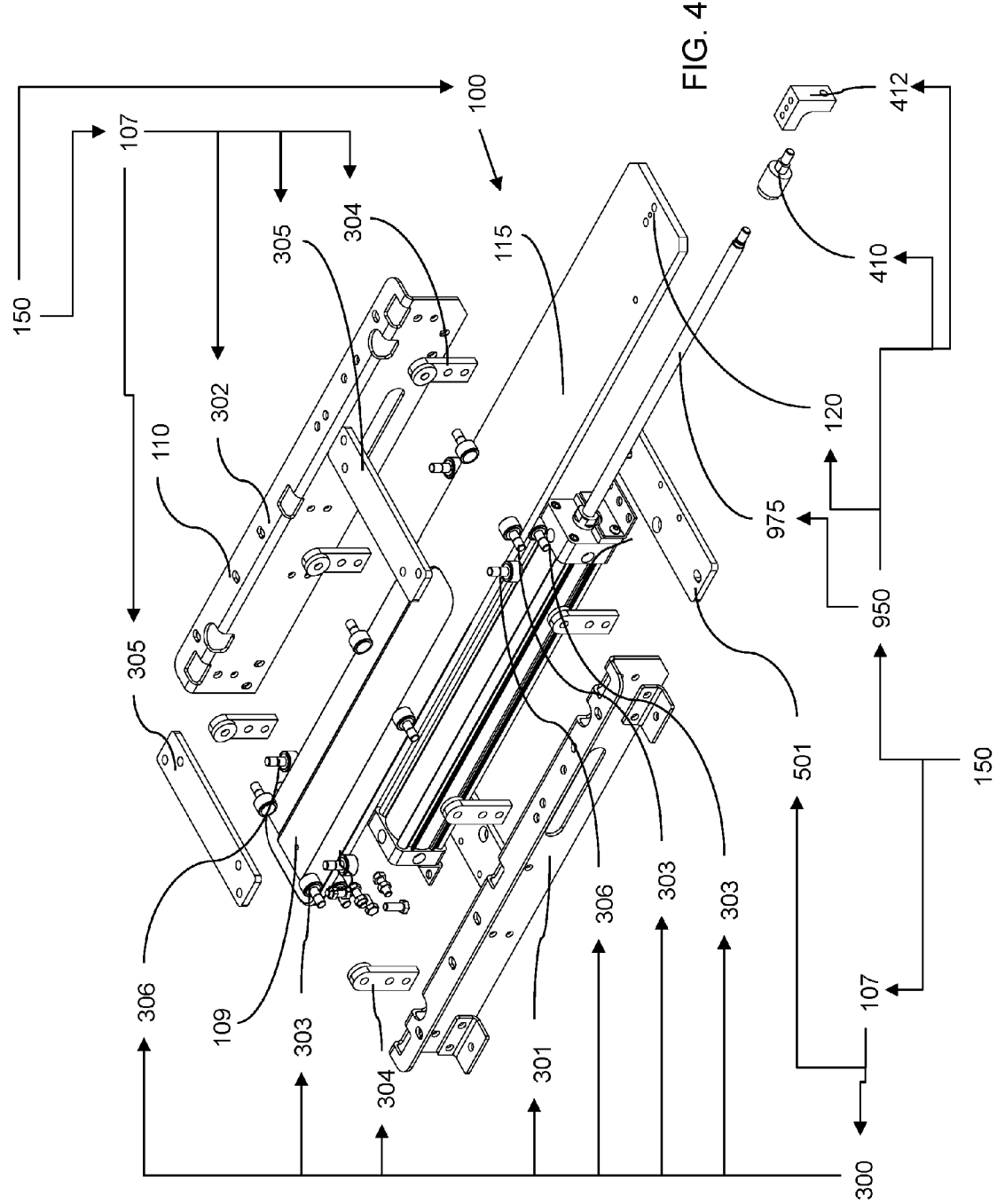
Figure 5A:
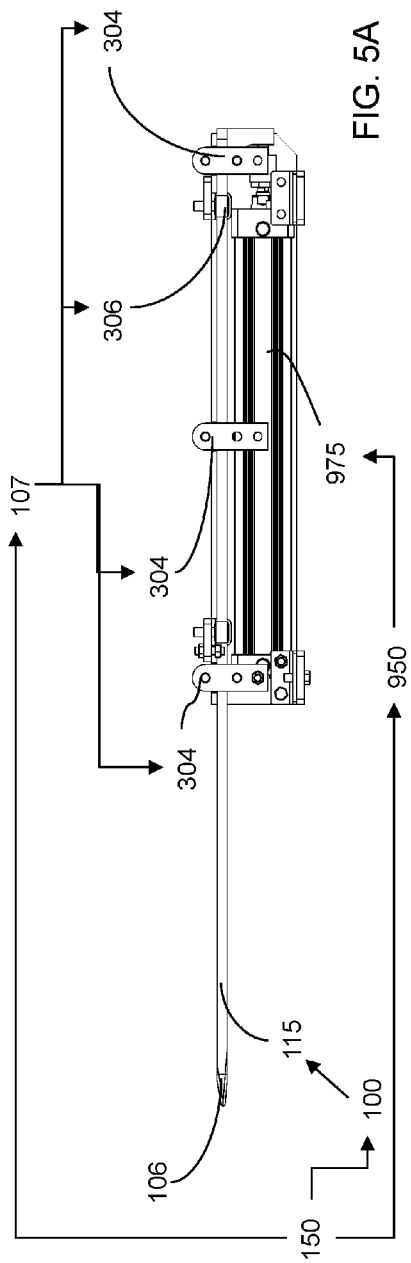
Figure 5B:
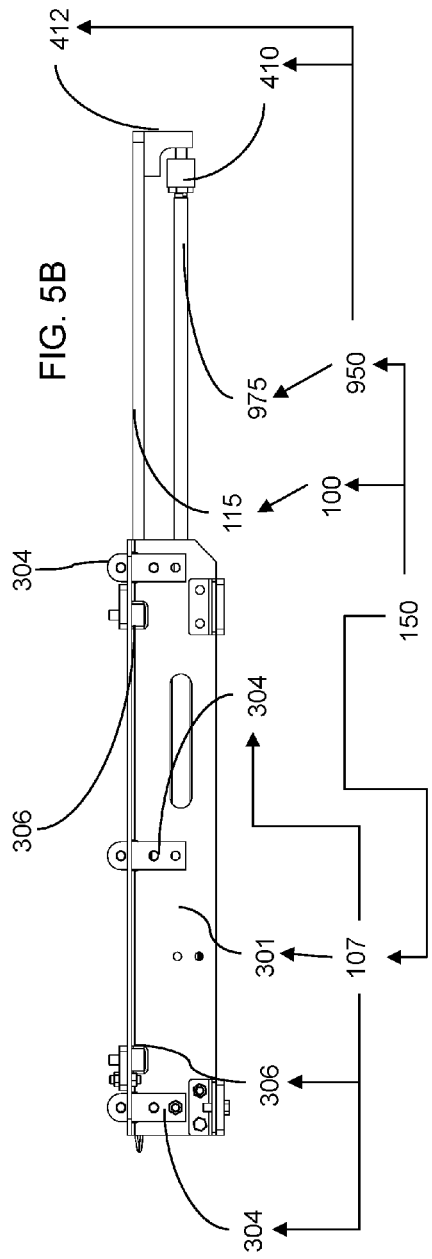
Figure 7A:
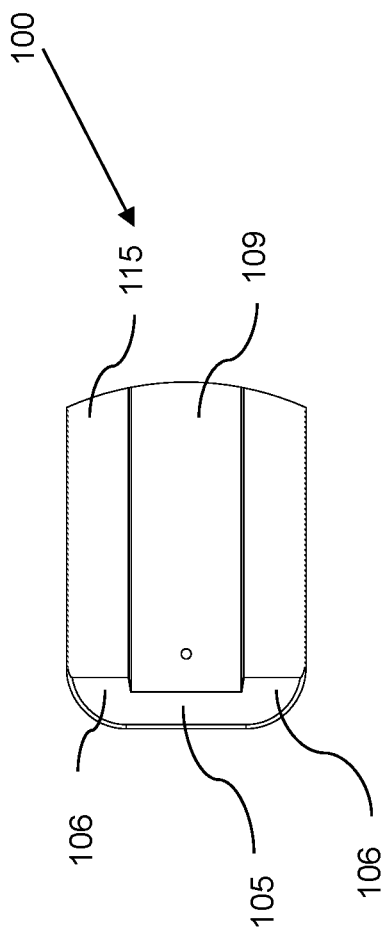
Figure 7B:
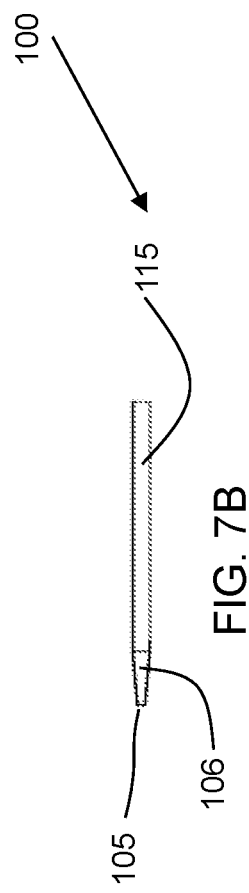
Figure 8:
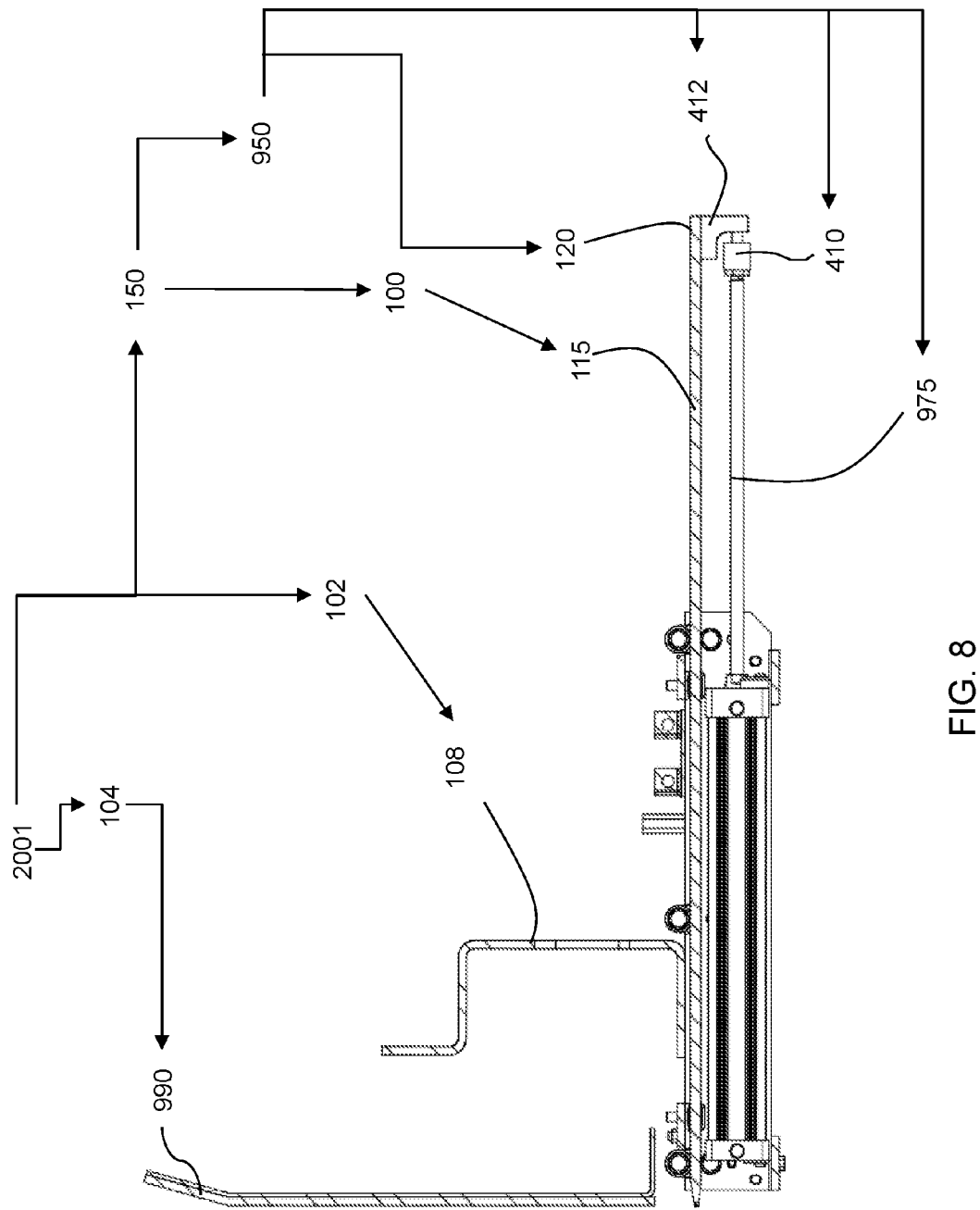
Figure 9B:
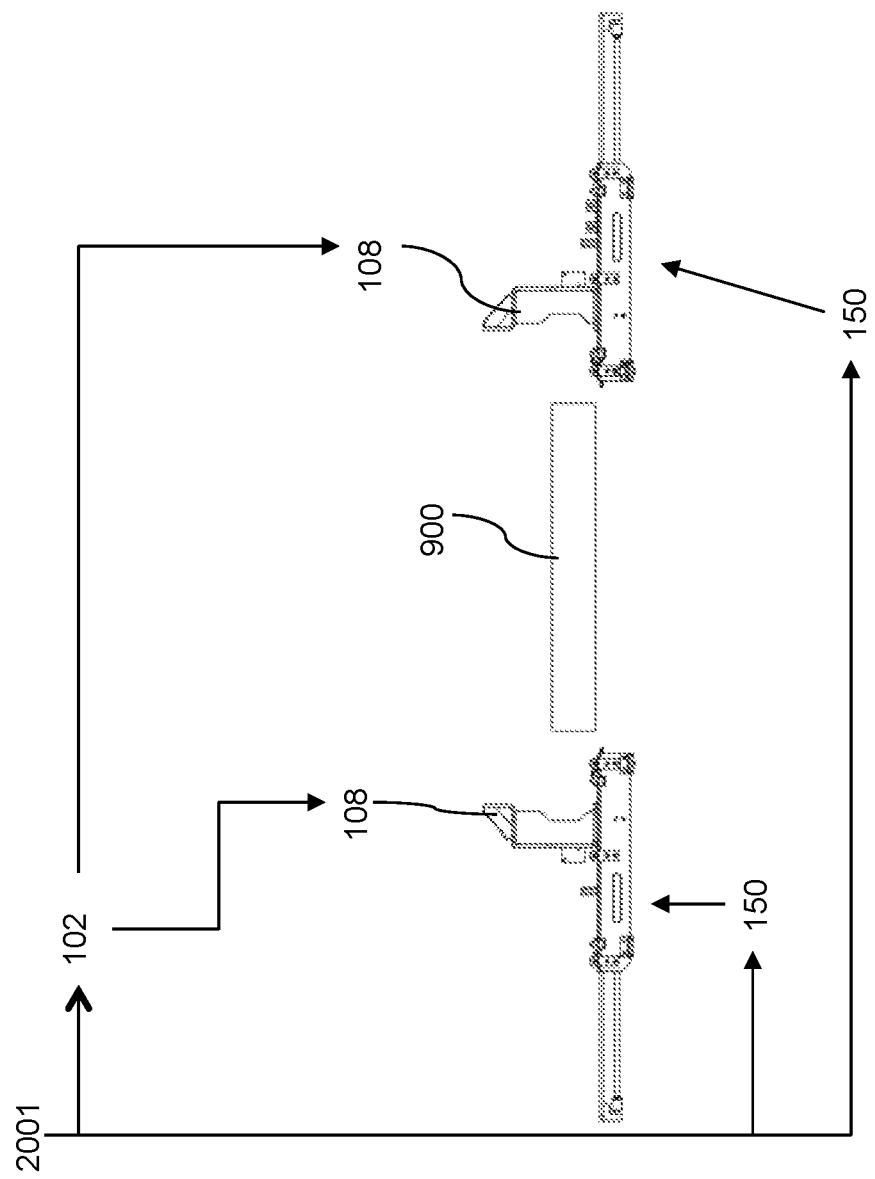
Figure 11:
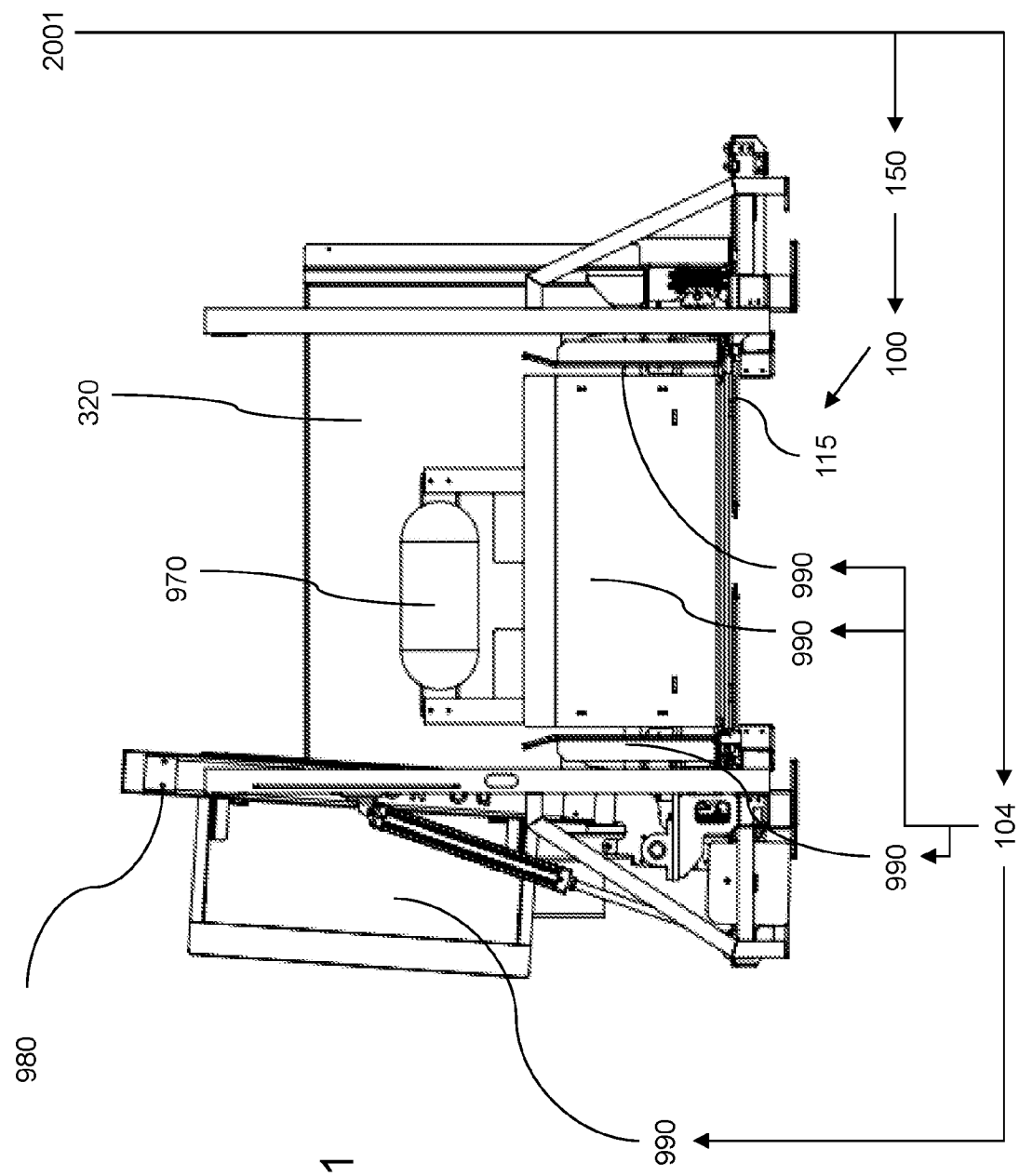
Figure 12:
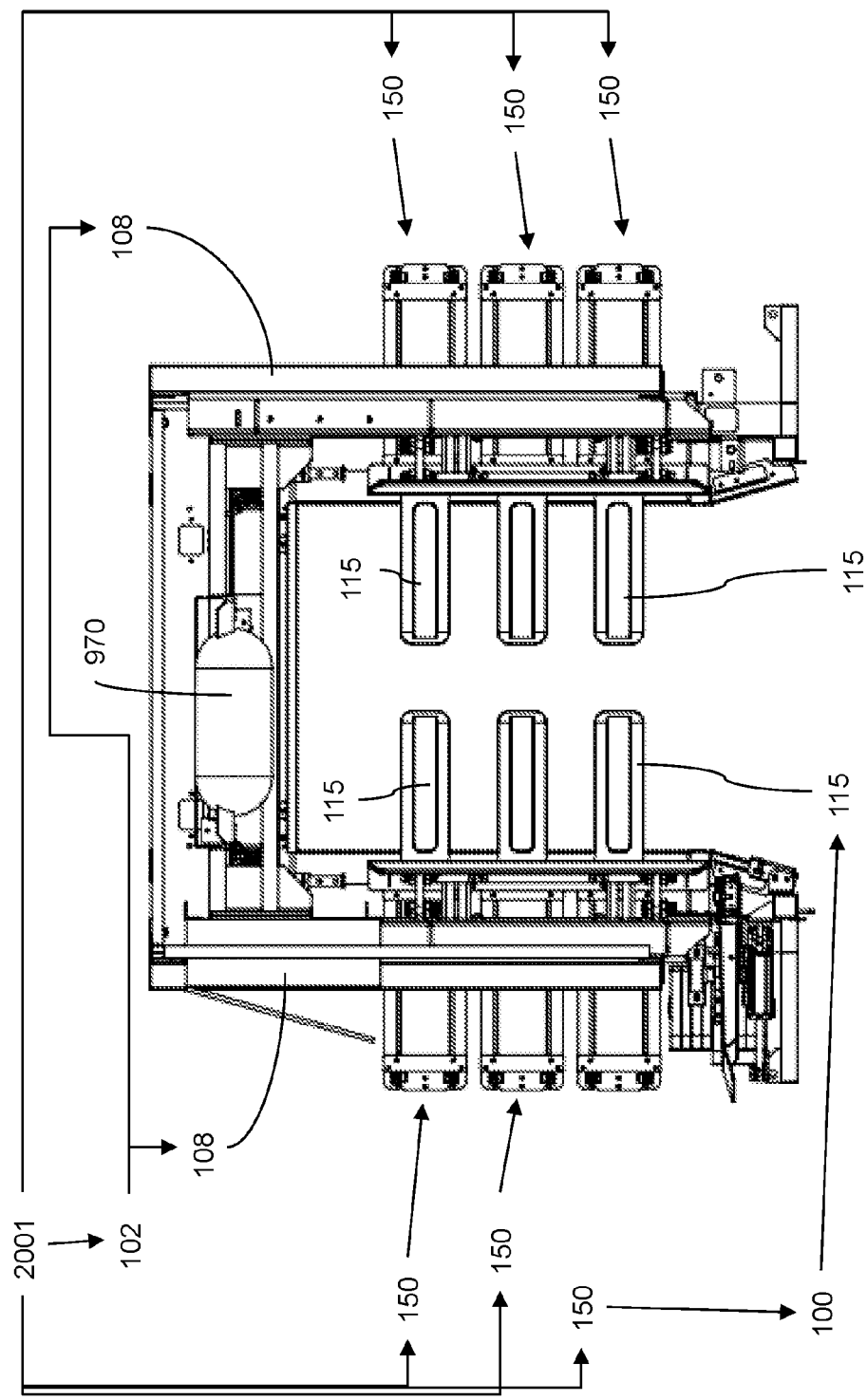
Figure 13:
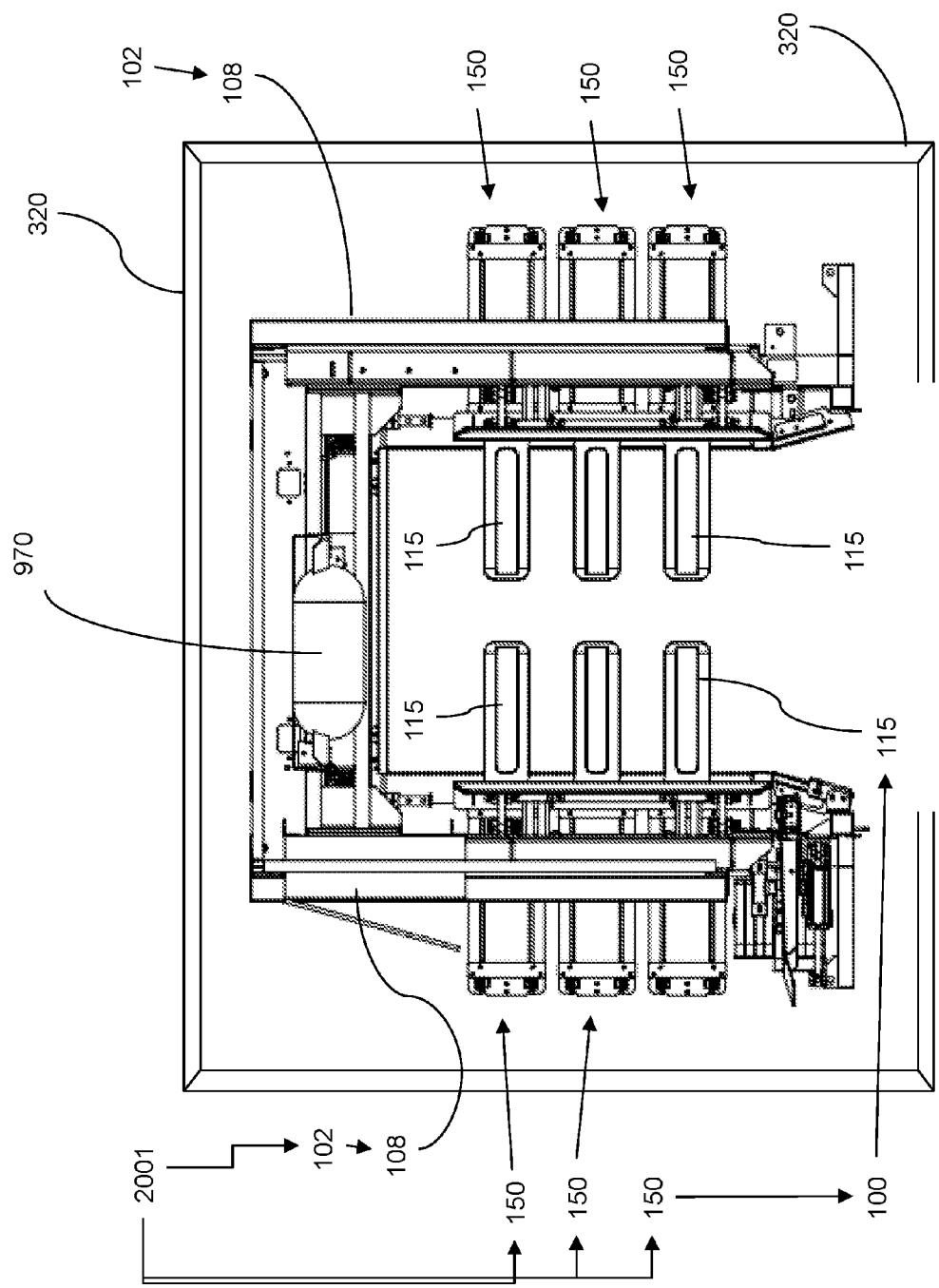
Figure 14:
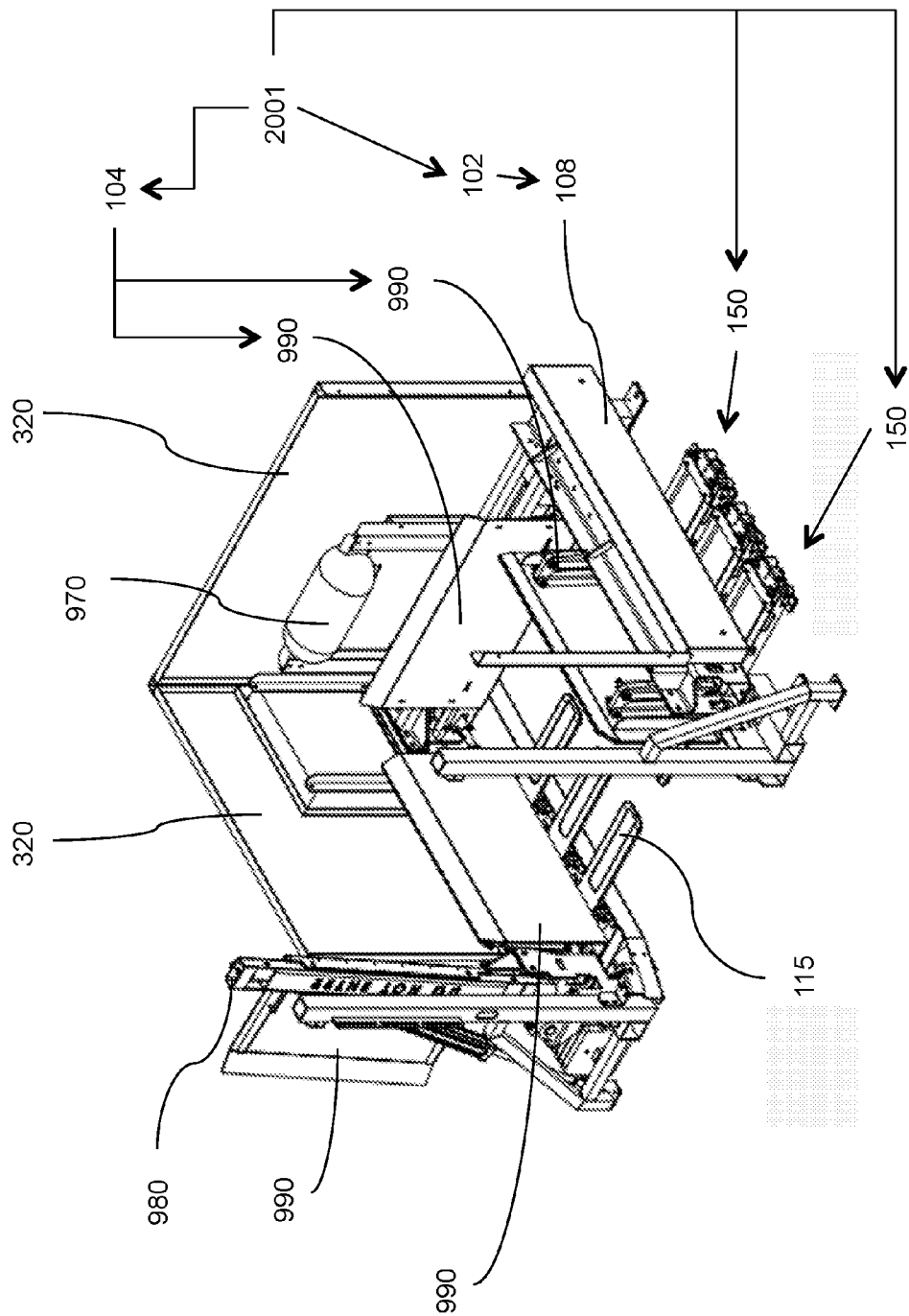
Figure 15:
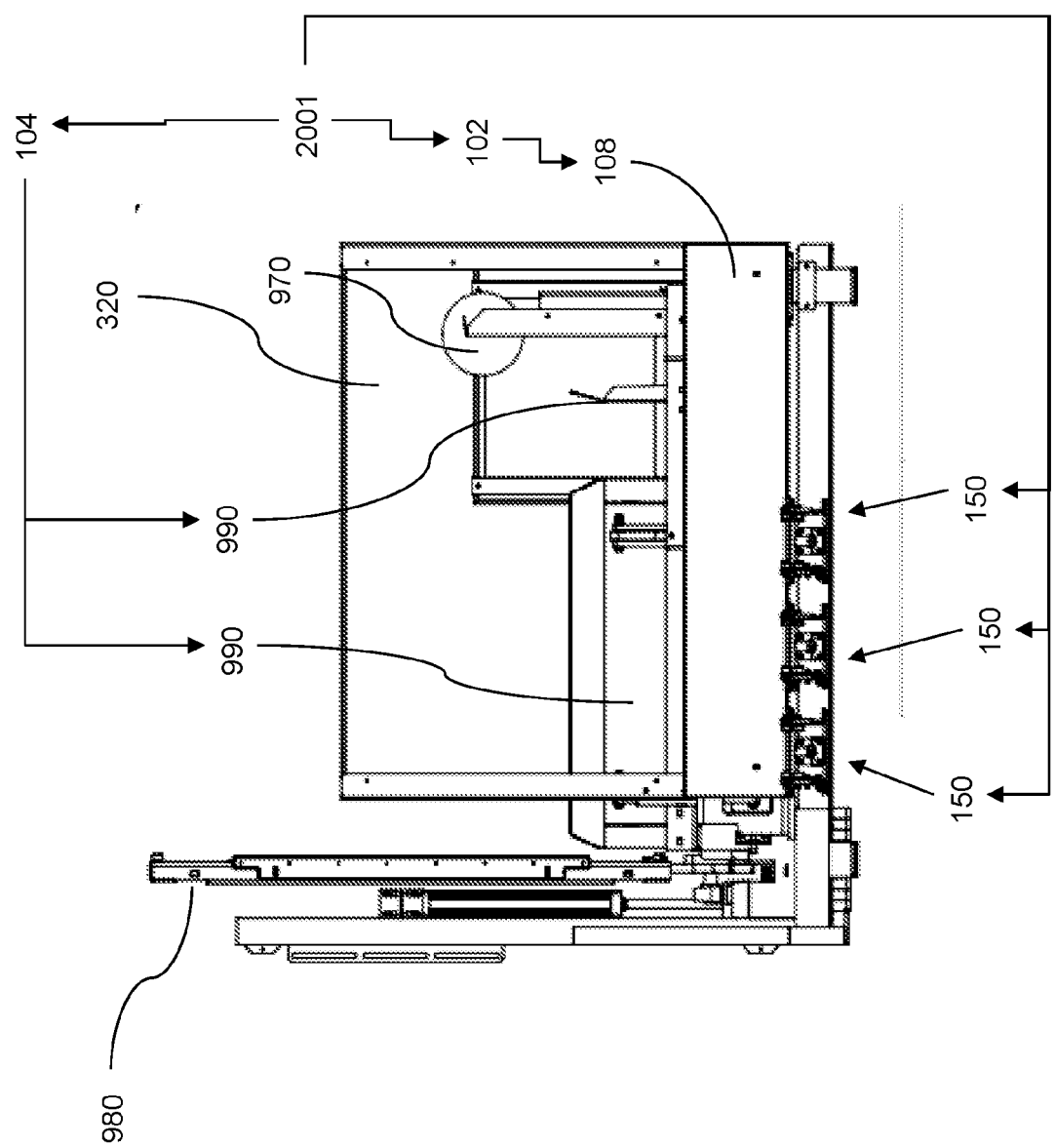
Figure 16:
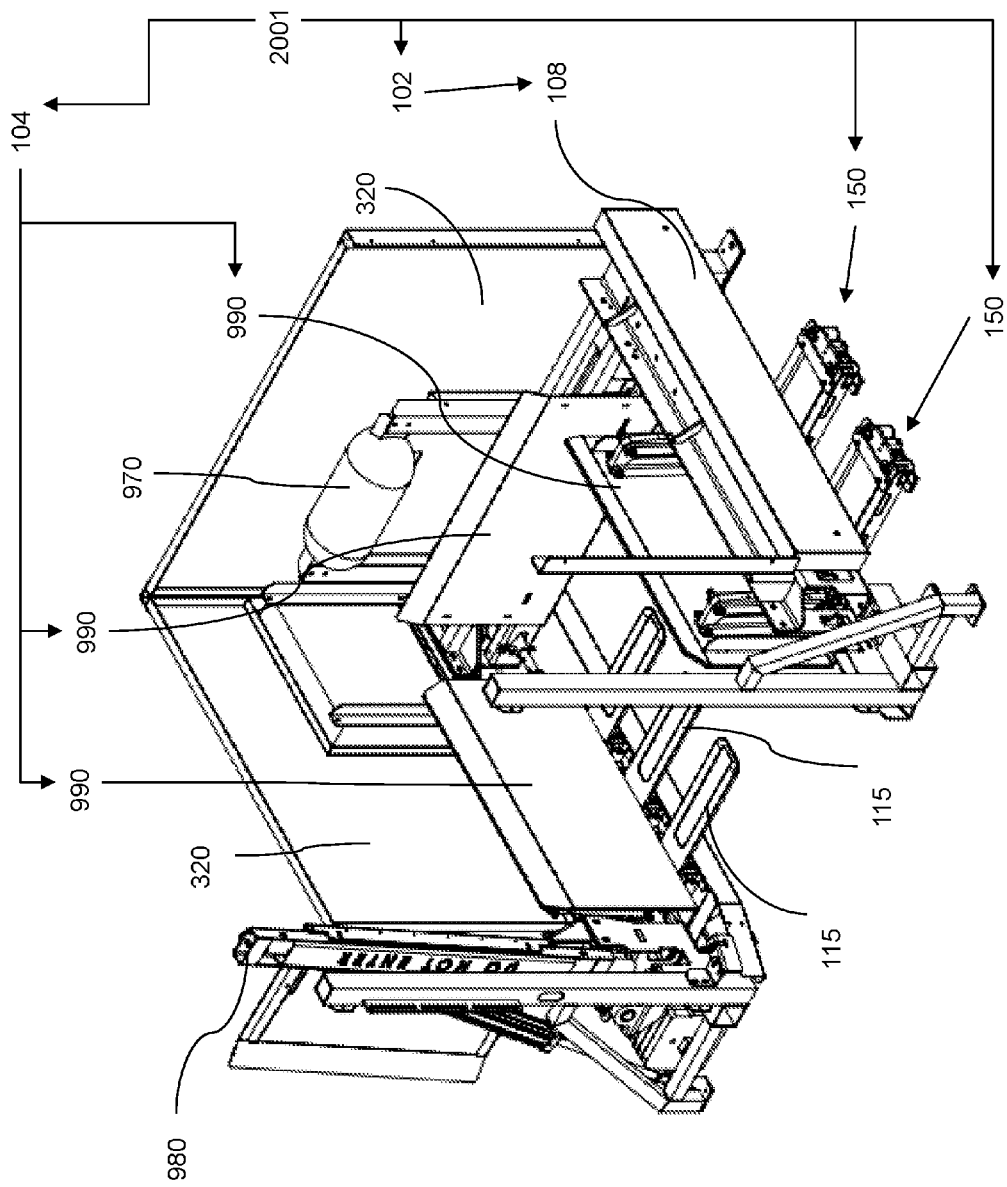
Figure 17:
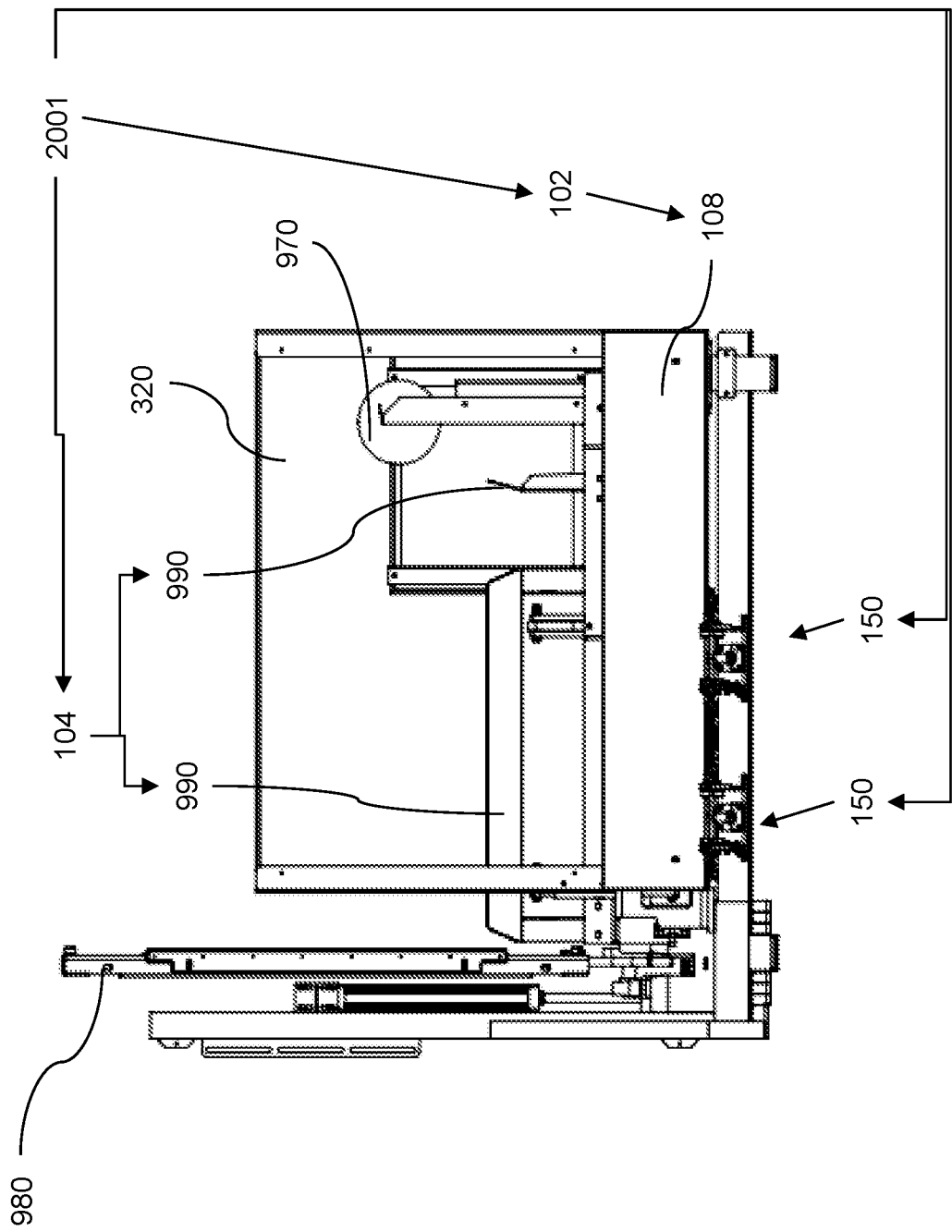

FIGS. 3A (SHEET 3/23) to 3F (SHEET 8/23), respectively, depict cross-sectional views of an example of the sequenced operations of the pallet-exchange machine (2001) of FIG. 1 and/or FIG. 2;

FIG. 4 (SHEET 9/23) depicts a perspective exploded view of an example of a blade assembly (150) used in the pallet-exchange machine (2001) of FIG. 1 and/or FIG. 2;

FIG. 5A (SHEET 10/23) depicts a cross-sectional side view of an example of the blade assembly (150) of FIG. 4;

FIG. 5B (SHEET 10/23) depicts a side view of an example of the blade assembly (150) of FIG. 4;

FIG. 6 (SHEET 11/23) depicts a top down view of an example of the blade assembly (150) of FIG. 4;

FIG. 7A (SHEET 12/23) depicts a partial top-down view of an example of the blade tip (105) of an example of the blade assembly (150) of FIG. 4;

FIG. 7B (SHEET 12/23) depicts a partial cross-sectional view of an example of a blade tip (105) of an example of the blade assembly (150) of FIG. 4;

FIG. 8 (SHEET 13/23) depicts a partial cross sectional view of an example of the blade assembly (150) of FIG. 7A and/or FIG. 7B;

FIG. 9A (SHEET 14/23) depicts a top down view of an example of the pallet-exchange machine (2001) of FIG. 1 and/or FIG. 2 having instances of the blade assembly (150) of FIG. 4;

FIG. 9B (SHEET 15/23) depicts a partial side view of instances of the blade assembly (150) of FIG. 4;

FIG. 10A (SHEET 16/23) depicts a top down view of an example of the pallet-exchange machine (2001) of FIG. 1 and/or FIG. 2 having instances of the blade assembly (150) of FIG. 4;

FIG. 10B (SHEET 16/23) depicts a partial side view of an example of the pallet-exchange machine (2001) of FIG. 1 and/or FIG. 2 having instances of the blade assembly (150) of FIG. 4;

FIG. 11 (SHEET 17/23) depicts a front view of an example of the pallet-exchange machine (2001) of FIG. 1 and/or FIG. 2 having instances of the blade assembly (150) of FIG. 4;

FIG. 12 (SHEET 18/23) depicts a top down view of an example of the pallet-exchange machine (2001) of FIG. 1 and/or FIG. 2 having instances of the blade assembly (150) of FIG. 4;

FIG. 13 (SHEET 19/23) depicts a top down view of an example of the pallet-exchange machine (2001) of FIG. 1 and/or FIG. 2 having instances of the blade assembly (150) of FIG. 4;

FIG. 14 (SHEET 20/23) depicts a top perspective view of an example of the pallet-exchange machine (2001) of FIG. 1 and/or FIG. 2 having instances of the blade assembly (150) of FIG. 4;

FIG. 15 (SHEET 21/23) depicts a side view of another example of the pallet-exchange machine (2001) of FIG. 1 and/or FIG. 2 having instances of the blade assembly (150) of FIG. 4;

FIG. 16 (SHEET 22/23) depicts a top perspective view of an example of the pallet-exchange machine (2001) of FIG. 1 and/or FIG. 2 having instances of the blade assembly (150) of FIG. 4;

FIG. 17 (SHEET 23/23) depicts a side view of an example of the pallet-exchange machine (2001) of FIG. 1 and/or FIG. 2 having instances of the blade assembly (150) of FIG. 4;

The drawings are not necessarily to scale and may be illustrated by phantom lines, diagrammatic representations and fragmentary views. In certain instances, details not necessary for an understanding of the embodiments (and/or details that render other details difficult to perceive) may have been omitted. In some other instances, the drawings may not depict a valid operational state for the device. These drawings are provided in order to provide clarity and to assist in understanding the details of the device.

Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating understanding of the various presently disclosed embodiments.

In addition, common, but well-understood, elements that are useful or necessary in commercially feasible embodiments are often not depicted in order to facilitate a less obstructed view of the various embodiments of the present disclosure.

LISTING OF REFERENCE NUMERALS USED IN THE DRAWINGS 100 blade support
102 frame assembly
104 clamp assembly
105 blade tip, or leading edge
106 rounded edges
107 blade-support frame
108 pallet-exchange frame, or side frame
109 friction-reducing element
110 frame attachment point
115 blade
120 attachment point
150 blade assembly
300 cam-follower apparatus
301 first side frame
302 second side frame
303 vertical cam follower, or vertical cam followers
304 vertical cam follower support, or vertical cam follower supports
305 lateral cam follower support, or lateral cam follower supports
306 lateral cam follower, or lateral cam followers
320 perimeter fence
410 rod coupler
412 bracket
501 frame member
900 load
902 pallet
904 replacement pallet
950 actuator assembly
975 pneumatic cylinder
980 front gate
1000 sag portion
1050 gap
2000 load
2001 pallet-exchange machine

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of the description herein, the terms "upper," "lower," "left," "rear," "right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments (examples), aspects and/or concepts defined in the appended claims. Hence, specific dimensions and other physical characteristics relating to the embodiments disclosed herein are not to be considered as limiting, unless the claims expressly state otherwise. It is understood that "at least one" is equivalent to "a".

FIG. 1 (SHEET 1/23) depicts a perspective view of an example of a pallet-exchange machine (2001).

In general terms (and applicable to all of the FIGS.), the pallet-exchange machine (2001) includes or has a frame assembly (102). The frame assembly (102) is configured to receive a pallet (902) supporting a load (900) once the pallet (902) is positioned in the frame assembly (102) (to do just so). The pallet-exchange machine (2001) also includes a clamp assembly (104). The clamp assembly (104) is supported by the frame assembly (102) of the pallet-exchange machine (2001). The clamp assembly (104) is configured to clamp and hold the load (900) once the pallet (902) is positioned in the clamp assembly (104) (to do just so). The pallet-exchange machine (2001) also includes a blade assembly (150). The blade assembly (150) is configured to be movable relative to the frame assembly (102) between a load-support position and a no-load position. The blade assembly (150) is configured to assist in supporting the load (900) once the clamp assembly (104) is actuated to clamp and to hold the load (900), and once the blade assembly (150) is moved from the no-load position to the load-support position (to do just so).

Referring to the example of FIG. 1, the pallet-exchange machine (2001) includes (or is implemented as) a low-level pallet exchanger. The frame assembly (102) and the clamp assembly (104) are part of the low-level pallet exchanger, and are positioned proximate to (adjacent to) the floor, with enough space to receive a single instance of a pallet so that the pallet is positioned underneath the clamp assembly (104). In some examples, the frame assembly (102) includes a front gate (980) configured to allow for the pallet (902) supporting the load (900) to be positioned (by a pallet mover) in the pallet-exchange machine (2001). An example of a low-level pallet exchanger is described in U.S. patent application Ser. No. 61/721,352, the contents of which are herein incorporated by reference.

FIG. 2 (SHEET 2/23) depicts a perspective view of another example of the pallet-exchange machine (2001) where the pallet-exchange machine (2001) includes (or is incorporated in) a stacking clamp. In the example shown in FIG. 2, the frame assembly (102) and the clamp assembly (104) are part of a stacking clamp, and are positioned distal to the floor, at a height above the floor to accommodate more than one pallet underneath the clamp assembly (104). An example of a stacking clamp is described in U.S. Pat. No. 6,045,324 (REDMAN, Apr. 4, 2004), the contents of which are herein incorporated by reference.

FIGS. 3A (SHEET 3/23) to 3F (SHEET 8/23) depict cross sectional views of examples of the pallet-exchange machine (2001) illustrating an example sequence of a pallet exchange (that is, a method of exchanging a pallet having a load with a replacement pallet).

Figure 3C:
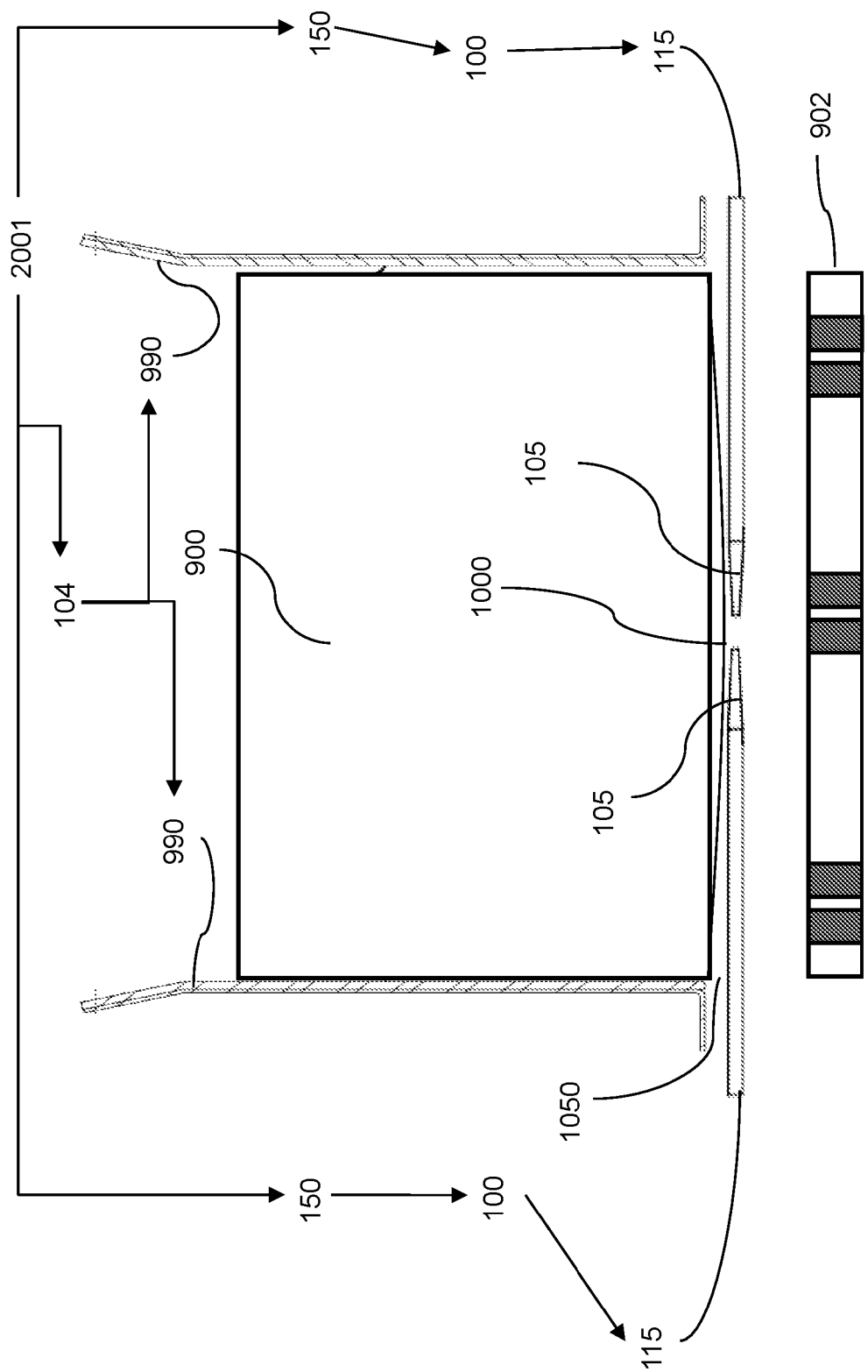

Referring to FIGS. 3A, 3B, and 3C, once the load (900) is clamped and is held by the clamp assembly (104), the pallet (902) is moved away from the load (900). Once the pallet (902) is moved from the load (900), the load (900) sags at a sag portion (1000) and contacts, at least in part, the pallet (902). In this example, the load (900) forms a gap (1050) located between the pallet (902) and the load (900)

where the load (900) sags at the sag portion (1000) but does not contact the pallet (902). The blade assembly (150) is configured to be actuated to move into the gap (1050). The pallet (902) is further lowered away from the load (900) in such a way that the load (900) sags at the sag portion (1000) and contacts, at least in part, the blade assembly (150). The blade assembly (150) supports, at least in part, the load (900), but the pallet (902) is free to be moved away from the load (900) once the blade assembly (150) is positioned in the gap (1050).

Referring to FIG. 3B (SHEET 4/23), once the load (900) has been secured (clamped), the pallet (902) is lowered so that the top of the pallet (902) is approximately in-line with, or slightly lower than, the bottom of the blade support (100). A gap (1050) is formed between the load (900) and the pallet (902) so that the blade support (100), or in this example, the blade assembly (115), can be moved into the gap (1050). Once the load (900) is approximately in-line, or slightly lower than, the bottom of the blade assembly (150), the blade assembly (150) is moved into the gap formed between the pallet (902) and the load (900) so that the blade assembly (150), at least in part, supports the load (900). It will be appreciated that the blade assembly (150) includes, by way of example, the blade support (100) in accordance with an option (and other configurations are possible).

In some examples, once the pallet (902) is lowered (for example, by approximately two inches), the top of the pallet (902) is positioned in-line with, or slightly lower than, the bottom portion of the blade support (100) of the blade assembly (150). Once the pallet (902) is lowered (for example, by approximately two inches), a space or a gap is defined, and extends (for example, approximately four inches to about twelve inches) towards the center axis of the load (900). A skilled technician would understand that the dimensions of the space (or gap) and the distance lowered before a suitable instance of the gap (1050) is defined will vary depending on the characteristics of the load (900), the characteristics of the pallet-exchange machine (2001), and/or other variables.

In another example, a sensor (not shown, and known) is used to detect whether there is a sufficiently sized instance of the gap (1050) between the pallet (902) and the load (900) so that the blade assembly (150) may move between the no-load position and the load-support position. In an example, the sensor (not shown) is configured to determine whether the top portion of the pallet (902) is in-line or slightly below the top of the blade support (100) of the blade assembly (150). In this example embodiment, commercially available sensors (such as, an optical laser sensor) may be used, and is configured to detect the presence of a gap (1050) located between the load (900) and the pallet (902). A skilled technician would understand that other kinds of sensors may be used without departing from the scope of this disclosure. Furthermore, a skilled technician would understand that other methods of determining whether there is a sufficiently large enough instance of the gap (1050) for moving the blade support (100) of the blade assembly (150) may be used without departing from the scope of this disclosure.

Once the sensor (not shown) detects that there is a sufficiently sized instance of the gap (1050) between the pallet (902) and the load (900), the blade support (100) of the blade assembly (150) may move into the gap (1050). In this example, an actuator assembly (950) (depicted in FIG. 8), in this example a pneumatic cylinder (975), is used to extend the blade support (100) of the blade assembly (150) from a no-load position to a load-support position.

After the blade assembly (150) is moved into the gap (1050), the blade assembly (150) is in the load-support position. Once in this position, the blade assembly (150) supports, at least in part, the load (900). In another example embodiment, a user may manually move the blade assembly (150) by manually manipulating the blade assembly (150). Alternately, an electric motor or a hydraulic cylinder may be used to extend and retract the blade assembly (150). A skilled technician would understand that alternative systems for moving the blade assembly (150) may be used without departing from the scope of this disclosure.

The pallet-exchange machine (2001) may be configured so that when the sensor (not shown and known) detects a sufficiently sized instance of the gap (1050) between the pallet (902) and the load (900), the blade assembly (150) may be moved (automatically or semi-automatically) into the gap (1050) located between the pallet (902) and the load (900); that is, between a no-load position and the load-support position. In another example, when the sensor (not shown) detects a sufficiently sized instance of the gap (1050), an indicator (not shown and known) operatively connected to the sensor is activated. The indicator indicates (to the user) that there is a sufficiently sized instance of the gap (1050) between the pallet (902) and the load (900) so that the blade assembly (150) may be moved between the no-load position and the load-support position. An example of the indicator includes (and is not limited to) a lamp configured to activate (annunciate) once a sufficiently sized instance of the gap (1050) is detected. A skilled technician would understand that any indicator, such as an audio buzzer, may be used without departing from the scope of this disclosure.

Referring to FIG. 3C, an example is provided where the pallet (902) continues to be moved away from the load (900), and the load (900) remains clamped in a stationary position, and makes no further contact with the pallet (902). The pallet (902) can then be removed from the pallet-exchange machine (2001).

Figure 3D:
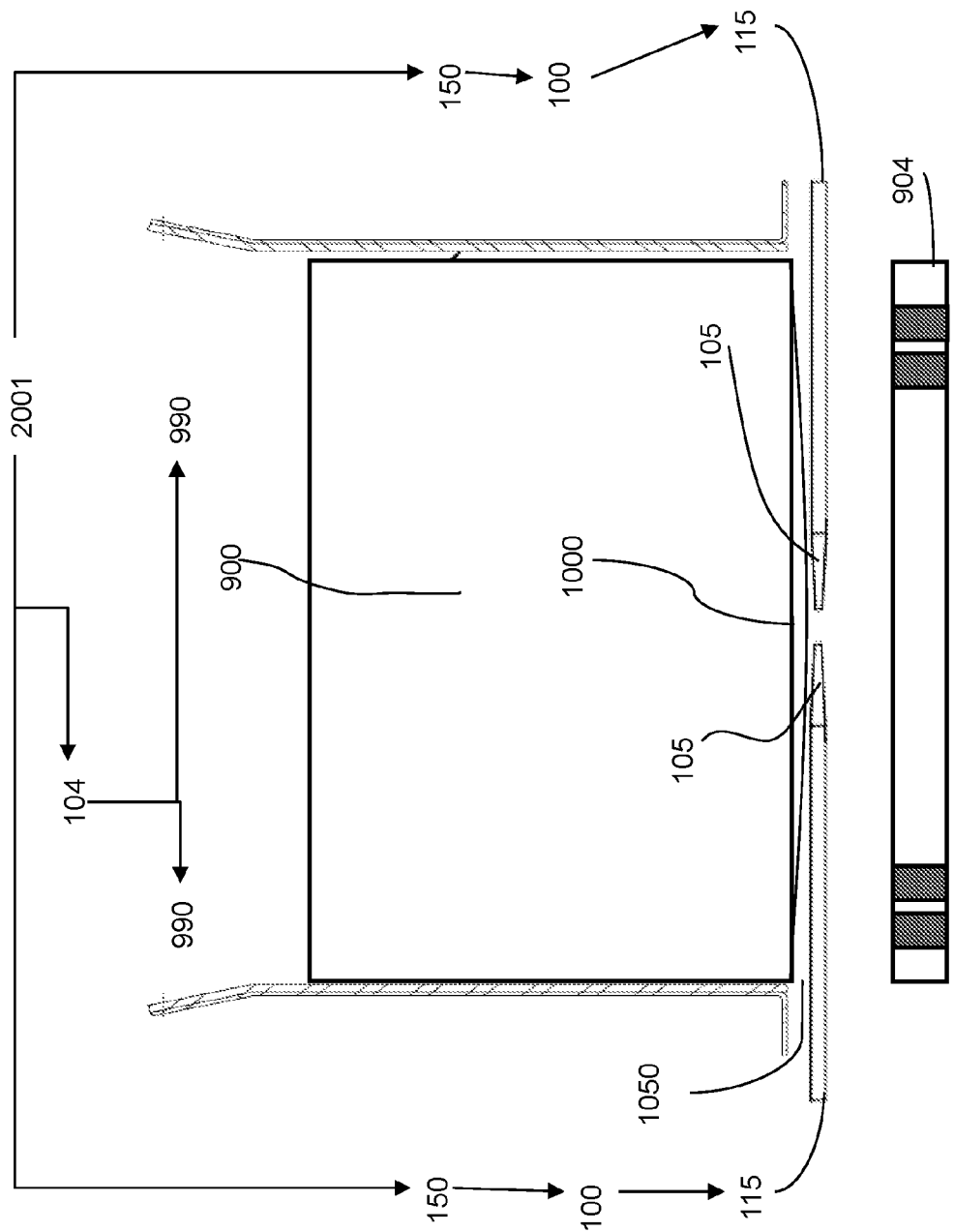

Referring now to FIG. 3D, the pallet (902) is replaced (exchanged) with a replacement pallet (904). Once the replacement pallet (904) is moved toward the load (900) and is positioned under the load (900), the replacement pallet (904) contacts, at least in part, the load (900). In this example, the load (900) sags at the sag portion (1000) and forms a space between the load (900) and the replacement pallet (904), and the space receives the blade assembly (150) can be moved into the space. The blade assembly (150) is in the space so that the blade assembly (150) continues to support, at least in part, the load (900) being clamped by the clamp assembly (104). The blade assembly (150) is then moved out of the space in such a way that the blade assembly (150) no longer supports the load (900) being clamped by the clamp assembly (104) but then the replacement pallet (904) bears or supports, at least in part, the load (900).

Figure 3E:
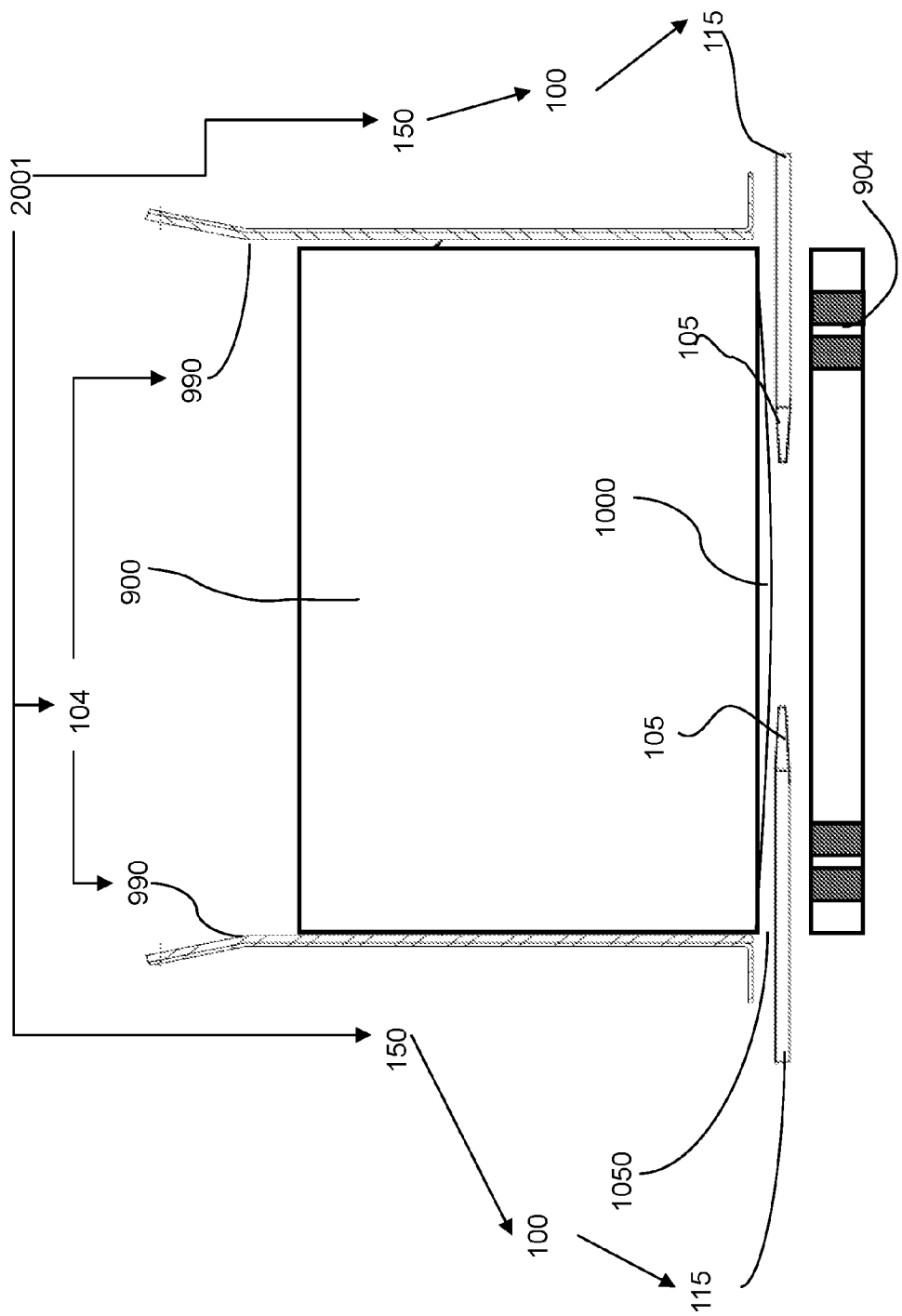
Figure 3F:
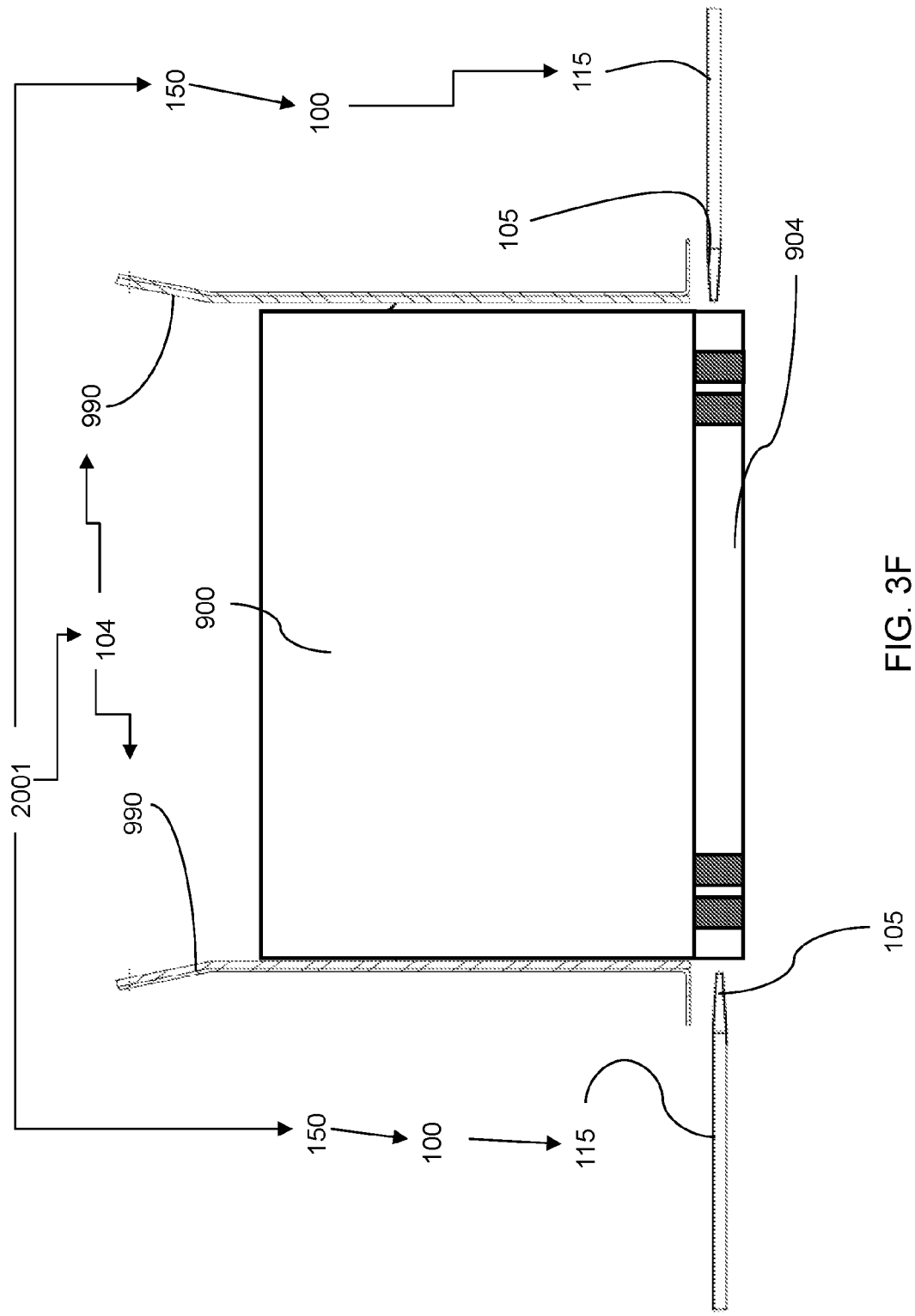

Referring to FIG. 3E (SHEET 7/23), the blade assembly (150) may be moved out of the load-support position before the replacement pallet (904) contacts, at least in part, the load (900). In this example, the blade assembly (150) is configured to begin moving out of the space once the replacement pallet (904) is positioned under the load (900). For example, a switch or trigger (not shown and known) is configured on the pallet-exchange machine (2001) that causes the blade assembly (150) to be moved from a load-support to a no-load position once the replacement pallet (904) is moved into a support position under the load (900).

In an example, the blade assembly (150) is configured to move between a load-support to a no-load position when the replacement pallet (904) is approximately 0.5 inches below the blade support (100). In another example, a sensor, such as the one previously described, is configured to determine that the replacement pallet (904) is approximately 0.5 inches below the blade support (100). Once the sensor determines that the replacement pallet (904) is approximately 0.5 inches below the blade support (100), the blade assembly (150) is configured to move from the load-support position to the no-load position. In another example, a sensor is configured to determine when the replacement pallet (904) is positioned at a suitable distance from the load (900) for the blade assembly (150) to be moved from the load-support to the no-load position.

In another example, the blade assembly (150) is configured to move from the load-support to the no-load position (automatically) once the replacement pallet (904) has been positioned beneath the load (900) so as to support, at least in part, the load (900). In another example, the sensor (not shown) detects that the replacement pallet (904) has been positioned under the load (900), and an indicator (that is operatively connected to the sensor) is configured to indicate (to the user) that the blade assembly (150) may be moved from the load-support position to the no-load position.

Once the blade assembly (150) is moved out of the space, the replacement pallet (904) is moved further toward the load (900) in such a way as to further support the load (900).

Once the replacement pallet (904) fully contacts the load (900), there is no space defined between the load (900) and the replacement pallet (904), and the load (900) no longer sags since the replacement pallet (904) provides support to the load (900). The clamp assembly (104) unclamps and no longer holds the load (900), and the load (900) is fully supported by the replacement pallet (904).

Referring to FIGS. 3A to 3F, the load (900) is placed or is supported on the pallet (902). The load (900) is moved into the pallet-exchange machine (2001) using a pallet transporter (not shown). In some examples, the pallet transporter (not shown and known) is configured to raise, lower, and move the pallet (902) supporting the load (900). Examples of pallet transporters include, but are not limited to, a hand-operated pallet jack, powered pallet jack, or a forklift. In the example shown in FIG. 3A, the pallet transporter is configured to position the load (900) and the pallet (902) so that the clamp assembly (104) can clamp the load (900). The pallet transporter is also configured to remove the pallet (902) from the pallet-exchange machine (2001) and replace it with a replacement pallet (904).

In the examples provided above, the blade assembly (150) is positioned below the clamp assembly (104). A skilled person would understand that the position of the blade assembly (150) will vary depending (may be accomplished) on the characteristics of the load (900) that is to be supported.

FIG. 4 (SHEET 9/23) is a perspective exploded view of an example of the blade assembly (150). The blade assembly (150) has a blade-support frame (107), and a blade support (100) that is movingly supported by the blade-support frame (107). The blade assembly (150) also has an actuator assembly (950). The actuator assembly (950) is configured on (positioned on or supported by) the blade-support frame (107). The actuator assembly (950) is configured to move the blade support (100) between the no-load position and the load-support position. The blade-support frame (107) is configured to support and to house the blade support (100) and the actuator assembly (950).

FIG. 5A (SHEET 10/23) depicts an example of the blade assembly (150) positioned in a load-support position.

FIG. 5B (SHEET 10/23) depicts an example of the blade assembly (150) positioned in a no-load position.

FIG. 6 (SHEET 11/23) depicts a top-down view of an example of the blade assembly (150) positioned in the load-support position.

Referring to FIGS. 4, 5A, 5B, and 6 the blade-support frame (107) includes a first side frame (301) and a second side frame (302) spaced apart from the first side frame (301). Refer to FIG. 4 for the location of the first side frame (302) and the second side frame (302). In some examples, the first side frame (301) and the second side frame (302) are mirror images of each other. A skilled technician would understand that alternate configurations of the associated frame may be used without departing from the scope of this disclosure.

The blade-support frame (107) also has a cam-follower apparatus (300) configured to movably connect the blade support (100) to the blade-support frame (107). Refer to FIG. 4 for the location of the cam follower apparatus (300). The cam-follower apparatus (300) is configured to support the blade support (100) and to restrict, direct, and control movement of the blade support (100) in the blade assembly (150). The cam-follower apparatus (300) is configured to reduce (at least in part) the frictional forces between the blade support (100) and the blade-support frame (107). For example, the cam-follower apparatus (300) is configured to restrict, direct, or control vertical movement and lateral movement of the blade support (100), and is also configured to reduce frictional forces between the blade support (100) and the blade-support frame (107).

Referring to FIGS. 4, 5A, 5B, and 6, the blade support (100) is connected to the first side frame (301) and the second side frame (302) by a cam-follower apparatus (300). The cam-follower apparatus (300) includes vertical cam follower supports (304) and lateral cam follower supports (305). Refer to FIGS. 4, 5A, 5B for the location of the vertical cam follower supports (304). Refer to FIGS. 4 and 6 for the location of the lateral cam follower supports (305). In this example, the vertical cam follower supports (304) are bolted to their respective instance of the first side frame (301) and the second side frame (302). A skilled technician would understand, however, that alternate methods of configuring the vertical cam follower support (304) to the first side frame (301) and the second side frame (302) may be used without departing from the scope of this disclosure.

The cam-follower apparatus (300) also includes the vertical cam followers (303) and the lateral cam followers (306) configured on (positioned on) the vertical cam follower supports (304) and the lateral cam follower supports (305). The vertical cam followers (303) and the lateral cam follower supports (305) are configured to secure the blade support (100) in the blade-support frame (107) so that the blade support (100) can move between the no-load position and the load-support position. A skilled person would understand that other ways to secure the blade support (100) to the blade-support frame (107) can be realized or may be accomplished without departing from the scope of this disclosure. For example, linear guides, bearings or friction plates could be used to secure the blade support (100) to the blade-support frame (107).

Referring to FIGS. 4, 5A, 5B, and 6, the vertical cam follower support (304) is configured to support the vertical cam followers (303). Refer to FIGS. 4 and 6 for the location of the vertical cam followers (303). The vertical cam followers (303) are configured so that the blade support (100) is located between the vertical cam followers (303), and the vertical cam followers (303) are supported by the vertical cam follower support (304). As shown in FIG. 4, the vertical cam followers (303) are configured to restrict the vertical movement of the blade support (100). In this example, each vertical cam follower support (304) has two instances of the vertical cam followers (303), so that one instance of the vertical cam follower (303) is positioned above the blade support (100) and the other instance of the vertical cam follower (303) is positioned below the blade support (100). By having the blade support (100) between the upper instance of the vertical cam follower (303) and the lower instance of the vertical cam follower (303), the blade support (100) is supported in the blade-support frame (107) and vertical movement of the blade support (100) is restricted. A skilled technician would understand that alternate methods of restricting, directing, or controlling the vertical movement of the blade support (100) can be used without departing from the scope of this disclosure.

Referring to FIGS. 4, 5A, 5B, and 6, the first side frame (301) and the second side frame (302) of the blade-support frame (107) also have a lateral cam follower support (305). Refer to FIGS. 4 and 6 for the location of the lateral cam follower support (305). In this example, the lateral cam follower support (305) is configured to bridge the first side frame (301) and the second side frame (302) of the blade-support frame (107). In this example, the lateral cam follower support (305) is bolted to the first side frame (301), and the second side frame (302) of the blade-support frame (107). In this example, the lateral cam follower support (305) bridges the first side frame (301), and the second side frame (302) is configured to provide structural rigidity to the blade-support frame (107). A skilled technician would understand that other ways of supporting the lateral cam follower support (305) may be used without departing from the scope of this disclosure.

Referring to FIGS. 4, 5A, 5B, and 6, the lateral cam follower support (305) has a corresponding instance of a lateral cam follower (306). Refer to FIGS. 4, 5A, and 5B for the location of the lateral cam follower (306). In this example, the lateral cam follower (306) is configured to limit the horizontal movement of the blade assembly (150). In this example, the lateral cam followers (306) are configured so that the first instance of the lateral cam follower (306) is configured on the first side frame (301) and the second instance of the lateral cam follower (306) is configured on the second side frame (302) of the blade-support frame (107). In this configuration, a first instance of the lateral cam follower (306) and a second instance of the lateral cam follower (306) flank each side of the blade support (100) so that lateral movement of the blade support (100) is restricted without restricting the ability of the blade support (100) to move into and out of the gap (1050). A skilled technician would understand that alternate methods of restricting, directing, or controlling the lateral movement of the blade support (100) can be used without departing from the scope of this disclosure.

FIG. 8 (SHEET 13/23) depicts a partial cross sectional view of an example of the blade assembly (150) as attached to a frame assembly (102) and is positioned in a no-load position.

FIG. 9A (SHEET 14/23) depicts a top down view of an example of the pallet-exchange machine (2001) having instances of the blade assembly (150) each configured on (positioned on) the frame assembly (102). The instances of the blade assembly (150) are each positioned in a no-load position.

FIG. 9B (SHEET 15/23) depicts a partial side view of two instances of the blade assembly (150) each configured on (positioned on) the frame assembly (102), and are each in a substantially opposed relation. The two instances of the blade assembly (150) are each positioned in a no-load position.

Referring to FIGS. 4, 5A, 5B, 8, and 9B, the actuator assembly (950) is supported by the blade-support frame (107). Refer to FIGS. 4, 5A, and 5B for the location of the actuator assembly (950). Refer to FIGS. 4 and 6 for the location of the blade support frame (107).

In the example shown in FIGS. 4 and 6, the blade-support frame (107) has a frame member (501) that spans the first side frame (301) and the second side frame (302) of the blade-support frame (107). Refer to FIG. 4 for the location of the frame member (501). Refer to FIGS. 4 and 6 for the location of the first side frame (301) and the second side frame (302). The pneumatic cylinder (975) is attached to the frame member (501). A skilled person would understand that alternative methods of mounting the actuator assembly (950) can be used (may be accomplished) that would not depart from the scope of this disclosure.

Referring to FIGS. 4, 5A, 5B, 8, and 9B, the actuator assembly (950) is further configured to be attached to the blade support (100). Refer to FIGS. 4, 5A, 5B, and 8 for the location of the blade support (100). In this example, one end of the pneumatic cylinder (975) is attached to the blade support (100) at the attachment point (120). Refer to FIGS. 4 and 6 for the location of the blade attachment point (120). The blade support (100) and the pneumatic cylinder (975) are connected at the attachment point (120) using a rod coupler (410). Refer to FIGS. 4, 5B, and 8 for the location of the rod coupler (410). Furthermore, the blade support (100) is configured to accept a bracket (412) that is bolted to the rod coupler (410). Refer to FIGS. 4, 5B, and 8 for the location of the bracket (412). In this example, using a rod coupler (410) allows for some acceptable amount of misalignment between the blade support (100) and the pneumatic cylinder (975). This may be useful in situations, for example, where the blade support (100) flexes or deforms when in a load-support position. In other examples, a bushing is used in place of the rod coupler (410) to connect the blade support (100) to the pneumatic cylinder (975). In yet another example, the pneumatic cylinder (975) and the blade support (100) are welded together. A skilled person would understand that alternate ways of connecting the pneumatic cylinder (975) to the blade support (100) can be used (may be accomplished) without departing from the scope of this disclosure.

Referring to FIGS. 4, 5A, 5B, 8, and 9B, the actuator assembly (950) includes (by way of example) a dual acting instance of the pneumatic cylinder (975). Refer to FIGS. 4, 5A, 5B, and 8 for the location of the actuator assembly (950). As pressurized air from the pneumatic power source is input (via a pneumatic circuit, known and not shown) into one input of the pneumatic cylinder (975), the pneumatic cylinder (975) extends. This extension is configured to move the blade support (100) in the gap (1050) defined between the load (900) and the pallet (902). That is, the expansion of the pneumatic cylinder (975) moves the blade support (100) between the no-load position and the load-support position. Alternately, as pressurized air is introduced into a second input of the pneumatic cylinder (975), the pneumatic cylinder (975) is configured to retract, thereby retracting the blade support (100) into the blade-support frame (107). In this example, a pneumatic valve (not shown and known) is configured to control the flow of air to either end of the pneumatic cylinder (975). A skilled technician would understand that alternate ways of actuating the blade support (100) may be used without departing from the scope of this disclosure.

Referring to FIGS. 4, 5A, 5B, 8, and 9B, a power source (not shown) is provided to power the actuator assembly (950). In some examples, the actuator assembly (950) of the blade assembly (150) is powered pneumatically. In another example, the actuator assembly (950) includes a pneumatic cylinder (975) configured to be connected to a pneumatic power supply (not shown) of the pallet-exchange machine (2001). In other examples, the actuator assembly (950) of the blade assembly (150) is powered electrically. In another example, the actuator assembly (950) includes an electric motor configured to drive an actuator (such as a worm screw) to move the blade assembly (150) between the no-load position and the load-support position.

In another example, the actuator assembly (950) of the blade assembly (150) is temporarily disconnected from the power source. This can be useful when more than one instance of the blade assembly (150) is required. This may be particularly useful when configuring the pallet-exchange machine (2001) with instances of the blade assembly (150) for a particular application. In this example, an operator can experiment with blade assembly (150) configurations in order to determine the optimal number of the blade assembly (150) required to handle the load of a particular application. Once the optimal number of the blade assembly (150) required may be determined based on the load (900) to be handled, unused or unnecessary instances of the blade assembly (150) can be removed from the pallet-exchange machine (2001).

Alternately, additional instances of the blade assembly (150) are configured to operate with the pallet-exchange machine (2001) if the load specifications change. For example, in a food production facility, the product stored in a combo box may change as needed (when the product in production changes, for example). Similarly, the cardboard thickness of a combo box may change, altering the characteristics of the load (900). In these cases, the load (900) may require support, at least in part, in a different location. In these cases, the blade assembly (150) is reconfigured on the pallet-exchange machine (2001), or additional instances of the blade assembly (150) are each configured to (operatively mount to) the pallet-exchange machine (2001), so that the load (900) is supported once the load (900) is handled, such as when the pallet (902) supporting the load (900) is replaced (exchanged) with another pallet.

In another example, a controller (not shown) is operatively connected to the actuator assembly (950). The controller is configured to control the movement of the blade assembly (150) between the no-load position and the load-support position. For example, the individual instances of the blade assembly (150) may be actuated sequentially, simultaneously, or in any order. A skilled technician would understand that the timing of the extension or retraction of the blades will depend on the characteristics of the load (900) being handled.

In other examples, the controller is configured to allow a user to control the blade assembly (150) independently of another instance of the blade assembly (150) in those applications where more than one instance of the blade assembly (150) is required. For instance, in some examples, each respective pneumatic cylinder (975) can be controlled by the controller located on the control panel of the pallet-exchange machine (2001); the controller is configured to actuate one or more instances of the actuator assembly (950).

In another example, the blade assembly (150) is positionable on and replaceable from the frame assembly (102) of the pallet-exchange machine (2001). In another example, the blade assembly (150) is configured to be attachable to the pallet-exchange machine (2001).

FIGS. 4, 6, 8, 9A, 9B, 10A, and 10B, depict examples of the blade assembly (150) each configured to attach to the pallet-exchange frame (108). . Refer to FIGS. 8, 9A, 9B, 10A, and 10B for the location of the pallet-exchange frame (108). The blade-support frame (107) is configured to attach to the frame assembly (102) of the pallet-exchange machine (2001). Refer to FIGS. 4, and 6 for the location of the blade support frame (107). In this example, the blade-support frame (107) is bolted (fixedly connected) to a side frame (108) of the frame assembly (102) at a corresponding instance of a frame attachment point (110) located on the pallet-exchange machine (2001). Refer to FIGS. 8, 9A, 9B, 10A, and 10B for the location of the frame assembly (102). Refer to FIGS. 8, 9A, 9B, 10A, and 10B for the location of the pallet-exchange machine (2001). Refer to FIG. 4 for the location of the frame attachment point (110). In other examples, the blade assembly (150) is welded (fixedly connected) to the frame assembly (102) of the pallet-exchange machine (2001). A skilled technician would understand that alternate methods of attaching the blade assembly (150) to the pallet-exchange frame (108) can be used without departing from the scope of this disclosure. Furthermore, a skilled technician would understand that in some embodiments, the blade support (100) may be fixed to the ground or another piece of equipment rather than being attached to the frame assembly (102) of the pallet-exchange machine (2001), if so desired.

In some examples, the blade assembly (150) may be used with different kinds of pallet-exchangers and pallet handlers. In some examples, the pallet handler includes a low-level instance of the pallet-exchange machine (2001). In another example, the blade assembly (150) is used with a stacking clamp as discussed above, and/or the blade assembly (150) may be used with other kinds of pallet exchangers and material handlers. For example, the blade assembly (150) can be configured on a two-sided clamping pallet exchanger, where one or more instances of the blade assembly (150) are each configured on one or more frames of the two-sided clamping-style pallet exchanger.

FIG. 7A (SHEET 12/23) depicts a cross-sectional view of an example of the blade tip (105) of an example of the blade support (100).

FIG. 7B (SHEET 12/23) depicts a top-down view of an example of the blade tip (105) of an example of the blade support (100).

The blade support (100) has a blade tip (105), which may also be called a leading edge, configured to prevent the blade assembly (150) from inadvertently damaging the load (900) once the blade assembly (150) is moved to the load-support position. In the examples provided in FIGS. 7A and 7B, the blade assembly (150) includes a blade support (100), and the blade support (100) is configured to prevent inadvertent damage to the load (900).

Referring to FIGS. 3A to 3F, 4, 5A, 6, 7A, 7B, 8, and 9A, the blade tip (105) of the blade support (100) is configured to prevent damage to the load (900). The blade tip (105) may be called a tip. The blade tip (105) may also be configured to reduce the force, for example frictional force, in order to facilitate improved actuation movement of the blade support (100) between the no-load position and the load-support position, or between the pallet (902) and the load (900). Refer to FIG. 6, 7A, and 7B for the location of the blade tip (105). Refer to FIGS. 3A to 3F for the location of the load (900). In some examples, the blade tip (105) of the blade support (100) may be beveled or chamfered so as to allow for easier extension of the blade support (100) between the pallet (902) and the load (900), as well as to reduce the possibility of inadvertent damage to the load (900). The blade tip (105) of the blade support (100) may also have rounded edges (or corners) (106) to further facilitate the movement of the blade support (100) between a no-load position and the load-support position while reducing inadvertent damage to the load (900). Refer to FIGS. 5A, 5B, 6, 7A, and 7B for the location of the rounded edges (106). In an example, the rounded edges (106) have about a 0.125 inch (⅛") radius edge on each of the corners of the blade tip (105) of the blade support (100).

In another example, the blade support (100) is a blade assembly (115). The blade support (100), as used in the blade assembly (150), can be of any appropriate size, shape, or material to support, at least in part, the load (900). For example, for the case where the blade assembly (150) is used with a low-level pallet exchanger, a blade assembly (115) includes steel and is dimensioned approximately six inches (6") wide and 0.5 inches thick, and allows the blade assembly (150) to support, at least in part, a broad variety or different types of the load (900) encountered in distribution centers and food production facilities. A skilled person would understand that the dimensions, materials, and shape of the blade (115) may vary (may be accomplished). For instance, in some implementations, the blade (115) may include a plastic material and/or a polycarbonate material (and may be more appropriate for those implementations). In accordance with another example, the blade assembly (115) may be longer in order to support, at least in part, a dimensionally larger instance of the load (900).

Alternate dimensions of the blade support (100) may also be used depending on the particular circumstances. In one example, the blade support (100) is wider than six inches (6") and can be used to support the load (900) (which may be called a pallet load). Using wider instances of the blade support (100) may generally require heavier-duty support structures and bearings in order to support both the blade support (100) and the load (900) as compared to a blade assembly (150) using a six inch (6") blade support (100). A wider instance of the blade support (100) introduces additional friction between the blade support (100) and the load (900) as compared to a narrower instance of the blade support (100) when the blade assembly (150) is moved between the no-load position and the load-support position. In order to account for these additional frictional forces, a more powerful instance of the actuator assembly (950) for the blade assembly (150) may be used (as may be required). In an example embodiment using a wider blade, the actuator assembly (950) may be sufficiently powered to counteract the additional frictional forces of the wider instance of the blade support (100).

In some examples, the material used may allow the blade support (100) to deflect slightly when the load (900) is supported by or applied to the blade support (100). In this example, the load (900), when supported at least in part by the blade support (100), may cause the top of the blade tip (105) of the blade support (100) to contact the bottom portion or bottom zone of the load (900), while the bottom of the blade tip (105) of the blade support (100) contacts the top portion or top zone of the pallet (902).

In another example, the blade assembly (150) has a friction-reducing element (109) configured to reduce the friction between the load (900) and the pallet (902) once the blade assembly (150) is moved into the load-support position. The friction-reducing element (109) is located in FIGS. 4, 6, and 7A.

FIGS. 4, 6, and 7A depict an example of the blade support (100) having a friction-reducing element (109). The friction-reducing element (109) includes, for example, a groove defined in or by the blade support (100). In one example, the friction-reducing element (109) is defined along the length of the blade support (100) on any one of the top section (surface) and the bottom section (or surface) of the blade support (100). The friction-reducing element (109) is configured to reduce the amount of the surface area in contact with the load (900) and the pallet (902) once the blade assembly (150) is moved from the no-load position to the load-support position. The reduced surface area reduces the frictional forces between the blade support (100), the load (900), and the pallet (902).

In an example, the friction-reducing element (109) is approximately 66% of the width of the blade support (100), or approximately four inches (4") of length for the friction-reducing element (109) for a blade assembly (150) of six inches (6") in length. This reduces the required amount of force required by the actuator assembly (950) for moving the blade assembly (150) between a no-load position and a load-support position. A skilled technician would understand that alternate ways of reducing friction could be used without departing from the scope of the disclosure. For instance, an anti-friction coating such as TEFLON™ material may be applied to the blade support (100) to reduce friction. In another example embodiment, the blade assembly (150) may have more than one groove for reducing the frictional forces between the blade support (100), the load (900), and the pallet (902).

In another example, the frame assembly (102) of the pallet-exchange machine (2001) is configured to support two or more instances of the blade assembly (150). Each instance of the blade assembly (150) is configured to support, at least in part, the load (900) once the instances of the blade assembly (150) are each placed in the load-support position.

FIG. 10A (SHEET 16/23) depicts a top down view of an example of the pallet-exchange machine (2001) having instances of the blade assembly (150) each configured on (positioned on or supported by) the frame assembly (102). The instances of the blade assembly (150) are each positioned in a load-support position.

FIG. 10B (SHEET 16/23) depicts a partial side view of an example of the pallet-exchange machine (2001) having instances of the blade assembly (150) each configured on (positioned on) the frame assembly (102) in a substantially opposed relation. The instances of the blade assembly (150) are each positioned in a load-support position.

FIG. 11 (SHEET 17/23) depicts a front view of an example of the pallet-exchange machine (2001) with the instances of the blade assembly (150) each configured on (positioned on) the frame assembly (102). Refer to FIGS. 8, 9A, 9B, 10A, 10B for the location of the frame assembly (102). The instances of the blade assembly (150) are each positioned in a load-support position.

FIG. 12 (SHEET 18/23) depicts a top down view of an example of the pallet-exchange machine (2001) with instances of the blade assembly (150) configured on (positioned on) the frame assembly (102). The instances of the blade assembly (150) are each positioned in a load-support position.

FIG. 13 (SHEET 19/23) depicts a top down view of an example of the pallet-exchange machine (2001) with instances of the blade assembly (150) each configured on (positioned on) the frame assembly (102). The instances of the blade assembly (150) are positioned in a load-support position. The pallet-exchange machine (2001) has a perimeter fence (320).

FIG. 14 (SHEET 20/23) depicts a top perspective view of an example of the pallet-exchange machine (2001) having instances of the blade assembly (150) each configured in a substantially opposing relation on the frame assembly (102). The instances of the blade assembly (150) are each positioned in a load-support position.

FIG. 15 (21/23) depicts a side view of another example of the pallet-exchange machine (2001) having three instances of the blade assembly (150) each configured on one side of the frame assembly (102).

FIG. 16 (SHEET 22/23) depicts a top perspective view of an example of the pallet-exchange machine (2001) having three instances of the blade assembly (150) each configured on (positioned on) one side of the frame assembly (102), and two instances of the blade assembly (150) configured on (positioned on) the opposite side of the frame assembly (102). The instances of the blade assembly (150) are each configured in a substantially opposing and offset relation. The instances of the blade assembly (150) are each positioned in a load-support position.

Referring now to the examples depicted in FIGS. 1, 2, 9A, 10A, 11, 12, 13, 14, 15, 16, and 17, one instance to three instances of the blade assembly (150) are each configured on (positioned on) each side frame (108) of the pallet-exchange machine (2001). The instances of the blade assemblies (150) are each configured to extend towards a central axis line of the pallet-exchange machine (2001) so that once the one or more instances of the blade assembly (150) are positioned in the load-support position, the load (900) is supported, at least in part, by the one or more instances of the blade assembly (150).

In another example, the two or more instances of the blade assembly (150) are positioned in an opposing arrangement on the frame assembly (102). In other examples, the two or more instances of the blade assembly (150) are substantially offset from a respective opposing instance of the blade assembly (150).

FIGS. 9A, 10A, 12, 13, 14, 15, and 16 depict examples of the blade assembly (150) positioned on the pallet-exchange machine (2001). As shown in FIGS. 9A, 10A, 12, 13, and 14, six instances of the blade assembly (150) (three instances on each side) are attached to each instance of the side frame (108) of the pallet-exchange machine (2001). The instances of the blade assembly (150) are each configured (positioned) in opposing relation.

FIG. 16 depicts five instances of the blade assembly (150) (three instances on one side and two instances on the other side) each attached to the side frames (108) of the pallet-exchange machine (2001). The instances of the blade assembly (150) are each configured in a staggered relation to the side frames (108) of the pallet-exchange machine (2001). A skilled technician would understand that alternate configurations of the blade assembly (150) may be used without departing from the scope of this disclosure.

FIG. 17 (SHEET 23/23) depicts a side view of an example pallet-exchange machine (2001) having two instances of the blade assembly (150) configured on (positioned on) one side of the frame assembly (102).

In other examples, the blade support (100) may be configured to extend towards a central point, or any other point, defined within the pallet-exchange machine (2001). A skilled technician would understand that alternate configurations of the blade assembly (150) may be used to support the load (900) that are within the scope of this disclosure. For example, one or more instances of the blade assembly (150) may be configured in each corner of the pallet-exchange machine (2001) so that the blade support (100) extends towards a center point of the pallet-exchange machine (2001).

In another example, the blade assembly (150) is enclosed in a housing (not shown). The housing is used to protect the internals of the blade assembly (150) such as the blade-support frame (107), the actuator assembly (950) or the blade support (100). The housing is also configured to prevent a user from accidentally interfering with the machinery of the blade assembly (150).

Referring to FIGS. 1, 13, 14, 15, 16, and 17, the pallet-exchange machine (2001) includes a perimeter fence (320). This perimeter fence (320) is used to prevent users from getting too close to the pallet-exchange machine (2001) in order to reduce the risk of injury. In yet another example embodiment, the system as described above can be enclosed in a housing to prevent users from getting too close to the pallet-exchange machine (2001) and to reduce the risk of injury.

In view of the foregoing, in general terms, there is provided a method for exchanging pallets. The method includes receiving a pallet (902) supporting a load (900) in a pallet exchanger. The pallet exchanger is configured to clamp the load (900) in a clamp assembly (104) once the load (900) is received in the pallet exchanger. Once the load (900) is clamped, the pallet (902) is moved away from the load (900) so that a gap (1050) is formed between the pallet (902) and the load (900) where the load (900) sags at the sag portion (1000) but does not contact the pallet (902).

Once the gap (1050) is formed, the pallet-exchange machine (2001) is configured to actuate a blade assembly (150) to a load-support position once the pallet (902) is moved away from the load (900) so that the blade assembly (150) assists in supporting the load (900) and so that the pallet (902) is free to be moved away from the load (900). Once the pallet (902) is free to be moved away from the load, the pallet (902) is replaced with a replacement pallet (904). The replacement pallet (904) is moved towards the load (900) and the replacement pallet (904) is positioned under the load (900) so that the replacement pallet (904) contacts, at least in part, the load (900). Once the replacement pallet (904) contacts, at least in part, the load (900), the blade assembly (150) is actuated to a no-load position so that the blade assembly (150) no longer supports the load (900) being clamped by the clamp assembly (104).

Once the blade assembly (150) no longer supports the load, the pallet-exchange machine (2001) is configured to unclamp the load (900) so that the clamp assembly (104) no longer supports the load (900) and so that the load (900) is fully supported by the replacement pallet (904).

In accordance with another example (in view of the foregoing), a method includes receiving a pallet (902) supporting a load (900) once the pallet (902) is positioned (to do just) so in a frame assembly (102). Once the pallet (902) is positioned in the clamp assembly (104), the clamp assembly (104) clamps and holds the load (900). In this example, the clamp assembly (104) is supported by the frame assembly (102). Once the load (900) is clamped and secured, a blade assembly (150) is moved relative to the frame assembly (102) between a no-load position and a load-support position. The blade assembly (150) is used to assist in supporting the load (900) once the clamp assembly (104) is actuated to clamp and to hold the load (900) and once the blade assembly (150) is moved from no-load position to the load-support position (to do just so).

Additional Description

The following clauses are offered as further description of the examples of the apparatus. Any one or more of the following clauses may be combinable, at least in part, with any another, at least in part, one or more of the following clauses. Any one of the following clauses may stand on its own merit without having to be combined with another other of the above-identified clauses. Clause (1): a pallet-exchange machine (2001) of any clause mentioned in this paragraph, comprising: a frame assembly (102) being configured to receive a pallet (902) supporting a load (900) once the pallet (902) is positioned (to do just so); a clamp assembly (104) being supported by the frame assembly (102), and the clamp assembly (104) being configured to clamp and hold the load (900) once the pallet (902) is positioned in the clamp assembly (104) (to do just so); and a blade assembly (150) being configured to be movable relative to the frame assembly (102) between a load-support position and an no-load position, and the blade assembly (150) being configured to assist in supporting the load (900) once the clamp assembly (104) is actuated to clamp and to hold the load (900) and once the blade assembly (150) is moved from no-load position to the load-support position (to do just so). Clause (2): the pallet-exchange machine (2001) of any clause mentioned in this paragraph, wherein as the load (900) is clamped and is held by the clamp assembly (104) the pallet (902) is moved away from the load (900); the load (900) sags and contacts, at least in part, the pallet (902); the load (900) forms a gap located between the pallet (902) and the load (900) where the load (900) sags and but does not contact the pallet (902); the blade assembly (150) is actuated to move into the gap; and the pallet (902) is further lowered away from the load (900) in such a way that the load (900) sags and contacts, at least in part, the blade assembly (150), and the blade assembly (150) supports, at least in part the load (900), but the pallet (902) is free to be moved away from the load (900). Clause (3): the pallet-exchange machine (2001) of any clause mentioned in this paragraph, wherein as the pallet (902) continues to be moved away from the load (900) the load (900) makes no further contact with the pallet (902); the pallet (902) is replaced with a replacement pallet (904); the replacement pallet (904) is moved toward the load and is positioned under the load (900); the replacement pallet (904) contacts, at least in part, the load (900); the load (900) sags and forms a space between the load (900) and the replacement pallet (904), and the space receives the blade assembly (150); the blade assembly (150) is moved out of the space in such a way that the blade assembly (150) no longer supports the load (900) being clamped by the clamp assembly (104); the replacement pallet (904) is moved further toward the load (900) in such a way as to further support the load (900); the clamp assembly (104) unclamps and no longer holds the load (900); and the load (900) is fully supported by the pallet (902). Clause (4): the pallet-exchange machine (2001) of any clause mentioned in this paragraph, wherein the blade assembly (150) is positioned below the clamp assembly (104). Clause (5): the pallet-exchange machine (2001) of any clause mentioned in this paragraph, wherein the blade assembly (150) is positionable on and replaceable from the frame assembly (102). Clause (6): the pallet-exchange machine (2001) of any clause mentioned in this paragraph, wherein the blade assembly (150) has a blade tip (105) configured to prevent the blade assembly (150) from damaging the load (2000) when the blade assembly (150) is moved in the load-support position. Clause (7): the pallet-exchange machine (2001) of any clause mentioned in this paragraph, wherein: the blade assembly (150) has a friction-reducing element (109) configured to reduce the friction between the load (2000) and the pallet (902) once the blade assembly (150) is moved into the load-support position. Clause (8): the pallet-exchange machine (2001) of any clause mentioned in this paragraph, wherein the blade assembly (150) is powered pneumatically. Clause (9): the pallet-exchange machine (2001) of any clause mentioned in this paragraph, wherein the blade assembly (150) is powered electrically. Clause (10): the pallet-exchange machine (2001) of any clause mentioned in this paragraph, wherein: the frame assembly (102) and the clamp assembly (104) are part of a low-level pallet exchanger and are positioned proximate to the floor. Clause (11): the pallet-exchange machine (2001) of any clause mentioned in this paragraph, wherein: the frame assembly (102) and the clamp assembly (104) are part of a stacking clamp and are positioned distal to the floor. Clause (12): the pallet-exchange machine (2001) of any clause mentioned in this paragraph, wherein: the frame assembly (102) is configured to support two or more instances of the blade assembly (150), each instance of the blade assembly (150) is configured to support, at least in part, the load (900) once the instances of the blade assembly (150) are placed in the load-support position. Clause (13): the pallet-exchange machine (2001) of any clause mentioned in this paragraph, wherein: the two or more instances of the blade assembly (150) are positioned in an opposing arrangement on the frame assembly (102). Clause (14): the pallet-exchange machine (2001) of any clause mentioned in this paragraph, wherein: the two or more instances of the blade assembly (150) are substantially offset from a respective opposing instance of the blade assembly (150). Clause (15): a blade assembly (150) comprising: a blade-support frame (107); a blade support (100) movingly supported by the blade-support frame (107); and an actuator assembly (950) being configured on the blade-support frame (107), and being configured for moving the blade support (118) between a no-load and load-support position. Clause (16): the blade assembly (150) of any clause mentioned in this paragraph, wherein: the blade assembly (150) is configured to be attachable to a pallet-exchange machine (2001). Clause (17): the blade assembly (150) of any clause mentioned in this paragraph, wherein: the actuator assembly (950) includes: a pneumatic cylinder (975) configured to be connected to a pneumatic power supply of the pallet-exchange machine (2001). Clause (18): the blade assembly (150) of any clause mentioned in this paragraph, wherein: the blade support (118) includes a blade assembly (115). Clause (19): the blade assembly (150) of any clause mentioned in this paragraph, wherein: the blade-support frame (107) includes: a vertical cam follower and a horizontal cam follower configured to support the blade support (100) on the blade-support frame (107). Clause (20): a method for exchanging pallets comprising: receiving a pallet (902) supporting a load (900) in a pallet exchanger; clamping the load (900) in a clamp assembly (104) once the load (900) is received in the pallet exchanger; moving the pallet (902) away from the load (900) so that a gap is formed between the pallet (902) and the load (900) where the load (900) sags and but does not contact the pallet (902); actuating a blade assembly (150) to a load-support position once the pallet (902) is moved away from the load (900) so that the blade assembly (150) assists in supporting the load (900) and so that the pallet (902) is free to be moved away from the load (900); replacing the pallet (902) with a replacement pallet (904); moving the replacement pallet (904) towards the load (900) and positioning the replacement pallet (904) under the load (900) so that the replacement pallet (904) contacts, at least in part, the load (900); actuating the blade assembly (150) to a no-load position so that the blade assembly (150) no longer supports the load (900) being clamped by the clamp assembly (104) once the replacement pallet (904) contacts, at least in part, the load (900); unclamping the load so that the clamp assembly (104) no longer supports the load (900) and so that the load (900) is fully supported by the replacement pallet (904). Clause (21): a method, comprising: receiving a pallet (902) supporting a load (900) once the pallet (902) is positioned (to do just so) in a frame assembly (102); clamping and holding the load (900) once the pallet (902) is positioned in the clamp assembly (104) (to do just so) by a clamp assembly (104) being supported by the frame assembly (102); moving a blade assembly (150) relative to the frame assembly (102) between a load-support position and an no-load position; and using the blade assembly (150) to assist in supporting the load (900) once the clamp assembly (104) is actuated to clamp and to hold the load (900) and once the blade assembly (150) is moved from no-load position to the load-support position (to do just so).

Food companies are realizing the potential risks of recalls and legal costs for contaminated products. There is a huge global push amongst many large multi-national companies to exchange incoming pallets for clean sanitized plastic pallets just before the product enters the process areas.

The food-combo case arrives on a wooden pallet and weighs between about 500 and about 2,500 pounds. Wood pallets are typically in a huge pool of pallets, and are not tracked by previous locations or uses. They can be contaminated with non-edible, poisonous or toxic chemicals, bacteria, and even E. coli bacteria, most of which are not visible. The food-combo case and the pallet are usually stored in inventory until they are needed for production and then transferred to the process area and placed into a dumper. This dumper is typically a three sided stainless steel enclosure with an upper hold down bar across the open top. The dumper then raises and tips the combination from about 150 to about 180 degrees in increments allowed by the downstream process. Raw product is typically ground and fed into their manufacturing process. The issue is raised for the case where the pallet is raised above the process grinder, and all kinds of contamination (including wood slivers and dirt) falls into the grinder and becomes inadvertently mixed in with the food.

Some known solutions to exchanging pallets for loads (including soft flexible containers) include hand stacking, home-made product pushers, pallet Inverters or load transfer systems. Hand stacking requires manual labour and results in potential and unwanted injuries and considerable lost production time. Product pushers create considerable product damage by inexperienced operators, and from sliding the product on pallets with exposed nail heads and wood slivers. Load pushers require using a fork truck and not the standard pallet jack equipment used by most food companies. Many companies consider this option and risk possible contamination simply because there isn't a high volume throughput alternative.

The pallet inverter is a slow system of pallet exchange taking approximately three minutes to automatically exchange a pallet. Not all products can be inverted and some products may be lost on the floor for the case where the seal between the lid and the food-combo case side is not continuous. Load transfer systems push the new pallet against the old pallet sliding it from under the load. Products are exposed to damage from sliding the product on pallets with exposed nail heads and wood slivers.

Known pallet-exchange machines used for pallet exchange are capable of clamping and holding products in cardboard cases and products that are relatively solid or frozen. After clamping the product, the pallet is lowered and removed out of the machine to be replaced by a different pallet. Companies typically exchange pallets because of pallet damage, pallet cost differences or for hygienic reasons.

Some products, however, are not solid enough to allow being clamped and self-supporting. These products include flexible non-rigid packages (such as PET bottles or cans in trays, bags), and irregular orientated case patterns that have large voids having no cases. Another huge product is the large 40 inch by 48 inch cardboard open top boxes called the combo. The combo is used in the food industry to transport raw material ingredients from suppliers to food-manufacturing companies. When non-solid products are clamped in known clamping-style pallet-exchange machines, the products are held well against all four sides of the rubber clamps, but when the pallet is lowered down, the load forms a belly (or sags) since they are no longer supported by the pallet, and the centre of the case or cases (in the combo) remains resting, at least in part, on the pallet. Known pallet-exchange machines cannot handle these products (types of loads for the pallets).

It is possible to add one instance, two instances or three instances of the blade assembly (150) along the right side and a left side of a frame of the pallet-exchanger machine. Each instance of the blade assembly (150) includes (for example) a 0.5 inch tall by six inch wide metal blade with leading edges that are rounded and are smooth to substantially prevent inadvertent cutting of the cardboard (the load). The blade assembly (150) also includes a series of cam followers configured to guide and to support the blade assembly (150). The blade assembly (150) also includes a pneumatic cylinder configured to extend the blade assembly (150). An example of how a pallet might be exchanged is to clamp the product (the load) in the pallet-exchange machine (2001), and lower the pallet down about two inches so the top of the pallet is in line with the bottom of the blade assembly (150). An opening is created (for example, of about two inches tall and approximately four inches to about twelve inches towards the centre of the pallet) between the bottom of the product (the load) and the pallet. This opening is detectable by a sensor that is configured to signal when the blade assembly (150) may be moved or pushed inward toward the centre (and above) of the pallet between the pallet and the load. Once the blade assembly (150) is fully extended, the pallet can be lowered further leaving the product (the load) supported by the clamps and the blade assembly (150). The pallet can then be removed and the new (replacement) pallet can be placed under the clamped load. The pallet is raised until it is approximately 0.5 inches below the blade assembly (150), and then the blade assembly (150) is retracted. Once the blade assembly (150) is fully retracted, the clamps are released and the exchange is complete.

It may be appreciated that the assemblies and modules described above may be connected with each other as may be used to perform desired functions and tasks that are within the scope of persons of skill in the art to make such combinations and permutations without having to describe each and every one of them in explicit terms. There is no particular assembly, or components that are superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for the purposes of this document, that the phrase "includes" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:

1. A pallet-exchange machine, comprising:
   a frame assembly configured to receive within it a load carried on a first pallet;
   a clamp assembly supported by the frame assembly, the clamp assembly configured to clamp and hold the load to release the load from the first pallet and permit the first pallet to be withdrawn and replaced by a second pallet; and
   a blade assembly movable relative to the frame assembly between a retracted no-load position and an extended load support position for providing subjacent support of the load to facilitate withdrawal of the first pallet and replacement by the second pallet;
   wherein the blade assembly has at least one blade member with a bearing surface that contacts the underside of the load when the blade assembly is in the extended load support position, such bearing surface having a recess formed therein to lessen frictional contact with the load.

2. The pallet-exchange machine of claim 1, wherein: the blade assembly is positioned below the clamp assembly and includes counter-posed blade members reciprocable between the retracted no load position and the extended load support position.

3. The pallet-exchange machine of claim 2, wherein each blade member has a bearing surface and a distal end.

4. The pallet-exchange machine of claim 3, wherein: the distal end of each blade member has rounded edges to prevent the blade member from impaling the load when the blade member is moved into the load-support position.

5. The pallet-exchange machine of claim 1, wherein:
   the blade assembly is powered pneumatically.

6. The pallet-exchange machine of claim 1, wherein:
   the blade assembly is powered electrically.

7. The pallet-exchange machine of claim 1, wherein:
   the frame assembly and the clamp assembly are part of a low-level pallet exchanger and are positioned proximate to the floor.

8. The pallet-exchange machine of claim 1, wherein:
   the frame assembly and the clamp assembly are part of a stacking clamp and are positioned distal to the floor.

9. The pallet-exchange machine of claim 1, wherein:
   the frame assembly is configured to support two or more instances of the blade assembly, each instance of the blade assembly is configured to support, at least in part, the load once the instances of the blade assembly are placed in the load-support position.

10. The pallet-exchange machine of claim 9, wherein:
    the two or more instances of the blade assembly are positioned in an opposing arrangement on the frame assembly.

11. The pallet-exchange machine of claim 9, wherein:
    the two or more instances of the blade assembly are substantially offset from a respective opposing instance of the blade assembly.

* * * * *